United States Patent
Tashiro et al.

(10) Patent No.: US 8,310,741 B2
(45) Date of Patent: Nov. 13, 2012

(54) IMAGE READING DEVICE AND IMAGE FORMING APPARATUS

(75) Inventors: Masaya Tashiro, Osaka (JP); Yoshiaki Tabata, Osaka (JP); Kei Tanaka, Osaka (JP); Masayuki Sago, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 393 days.

(21) Appl. No.: 12/687,614

(22) Filed: Jan. 14, 2010

(65) Prior Publication Data

US 2010/0220344 A1    Sep. 2, 2010

(30) Foreign Application Priority Data

Feb. 27, 2009  (JP) .................. 2009-047231
Feb. 27, 2009  (JP) .................. 2009-047255
Feb. 27, 2009  (JP) .................. 2009-047276

(51) Int. Cl.
  *H04N 1/46* (2006.01)
(52) U.S. Cl. ........ 358/509; 358/475; 358/446; 358/406; 358/504; 358/461; 358/1.12; 358/486; 358/496; 382/274
(58) Field of Classification Search .................. 358/515, 358/516, 518, 448, 474, 475, 483, 520, 480, 358/504, 505, 509, 510, 461, 462, 482, 446, 358/406, 1.12, 486, 496; 382/274
See application file for complete search history.

(56) References Cited

U.S. PATENT DOCUMENTS

| | | | |
|---|---|---|---|
| 6,191,873 B1 * | 2/2001 | Mizoguchi et al. | 358/516 |
| 7,002,546 B1 * | 2/2006 | Stuppi et al. | 345/102 |
| 7,265,781 B2 * | 9/2007 | Noguchi | 348/223.1 |
| 2006/0023271 A1 * | 2/2006 | Boay et al. | 358/504 |
| 2006/0290957 A1 * | 12/2006 | Kim et al. | 358/1.9 |
| 2009/0116080 A1 * | 5/2009 | Maruyama | 358/475 |

FOREIGN PATENT DOCUMENTS

JP    2003-058125    2/2003

* cited by examiner

*Primary Examiner* — Benny Q Tieu
*Assistant Examiner* — Quyen V Ngo
(74) *Attorney, Agent, or Firm* — Frommer Lawrence & Haug LLP

(57) ABSTRACT

An embodiment of an image reading device may include a light source, an image reading unit, a drive control unit, a white reference member, a chromaticity detecting unit, a reference value storage unit, a chromaticity change calculating unit, and/or a control unit. An embodiment may include a photoelectric conversion element that reads an image illuminated by the light source. In some embodiments, may measure the chromaticity of a white reference member. In some embodiments, a reference value storage unit may store a reference value representing the chromaticity of an image. In an embodiment, a control unit may control an operation of the device according to the calculated amount of chromaticity change. An embodiment may include measuring the luminous intensity of a light source and storing a reference value representing the luminous intensity of the light source. Some embodiments may include making adjustments to images.

20 Claims, 22 Drawing Sheets

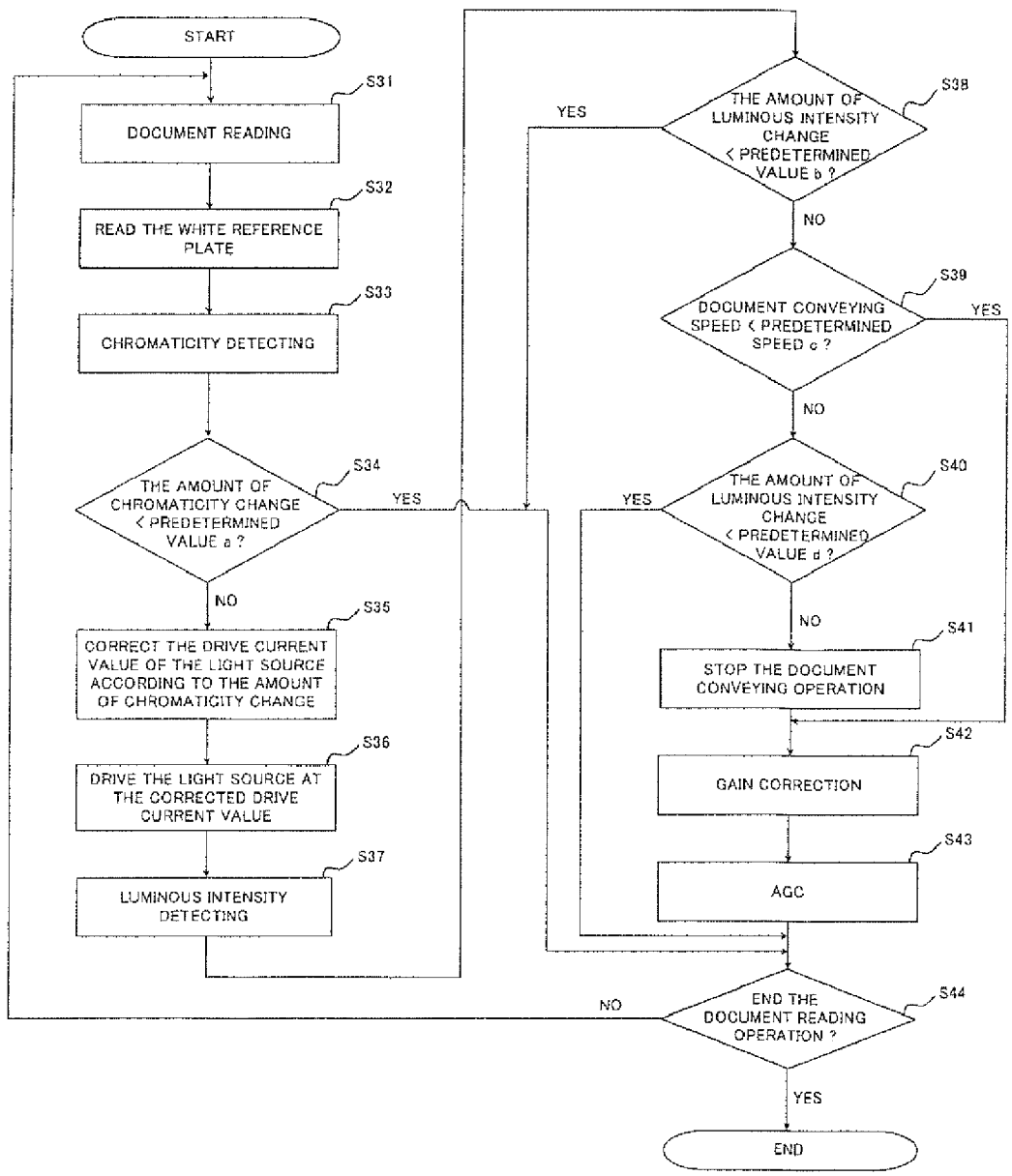
F I G. 7

THE MAXIMUM WIDTH OF A DOCUMENT READING

IMAGE READING DEVICE AND IMAGE FORMING APPARATUS

INCORPORATION BY REFERENCE

This application is based upon and claims the benefit of priority from the corresponding Japanese Patent applications No. 2009-047231, 2009-047255 and 2009-047276 filed Feb. 27, 2009, respectively, the entire contents of which are incorporated herein by reference.

FIELD OF THE INVENTION

The present invention relates to image reading devices and image forming apparatuses, and particularly to a technique for adjusting chromaticity of an image read by an image reading unit.

BACKGROUND OF THE INVENTION

It has been proposed that an image reading unit, such as a scanner, in an image forming apparatus uses a white light-emitting diode (hereinafter "LED") as a light source for reading images. Document reading methods for such an image reading unit often adopt a control technique that maintains luminous intensity of a white LED at a constant level through constant current control. However, when a white LED emits light continuously or for long periods of time, the temperature of the white LED increases. Even when constant current control is performed, chromaticity (x,y) changes as shown in FIG. 20, and a color of a read image changes.

That is, in a document reading method for an image reading unit using a white LED, when the white LED is driven to illuminate continuously, the temperature of the white LED increases. This characteristic of the white LED causes chromaticity to change in a negative direction. For example, when the image reading unit reads 100 document sheets continuously, there will be a change in color of a read image between the first sheet and the 100th sheet. As an example of a technique for correcting color variations caused by increased temperature, there is a proposed technique in which chromaticity is adjusted in a positive direction by reducing a value of drive current passed through a white LED. With this technique, by reducing LED forward current pulse (hereinafter "IFP") as shown in FIG. 22, it is possible to increase chromaticity (x,y) and correct variations in color of read images caused by increased temperature.

In the technique of the related art described above, even when chromaticity has been changed in a negative direction due to a change in temperature of a white LED, it is possible to restore the chromaticity to that at normal temperature, by reducing a value of drive current passed through the white LED to adjust the chromaticity in a positive direction. However, since the drive current value IFP for the white LED is reduced, luminous intensity of the white LED decreases as shown in FIG. 21. This may cause a problem in which a read image output from the image reading unit is dimmed.

SUMMARY OF THE INVENTION

An object of the present invention is to provide a technique in which, without dimming an image read by an image reading unit, it is possible to adjust a color of the read image, the color varying with temperature of a white LED.

An embodiment of an image reading device may include a light source, an image reading unit, a drive control unit, a reference member; a chromaticity detecting unit, a reference value storage unit, a chromaticity change calculating unit, and a control unit. In some embodiments, an image reading unit may include a photoelectric conversion element that reads an image illuminated by the light source. Some embodiments of a drive control unit may be configured to drive the image reading unit. In some embodiments, a reference member may be white and arranged at a position which allows the image reading unit to perform image reading. An embodiment of a chromaticity detecting unit may be configured to detect chromaticity of an image of the white reference member read by the image reading unit. In some embodiments, a reference value storage unit may be configured to store, as a reference value, a chromaticity value of an image of the white reference member read by the image reading unit at a predetermined normal temperature. An embodiment of a chromaticity change calculating unit may be configured to calculate an amount of chromaticity change. For example, the chromaticity change calculating unit may calculate the chromaticity difference between the chromaticity stored in the reference value storage unit (e.g., a reference value representing chromaticity) and the chromaticity detected by the chromaticity detecting unit during operation of the image reading unit. In an embodiment, the control unit may be configured to control an operation of the image reading device according to an amount of chromaticity change calculated by the chromaticity change calculating unit.

An embodiment of an image reading device may adjust a color of a read image. For example, the image reading device may be configured to adjust the color of a read image, since the color varies with a temperature of the light source from the image reading unit.

An embodiment of an image forming apparatus may include the image reading device described above.

Some embodiments may include an image forming apparatus having an image reading device capable of adjusting a color of an image read (e.g., read image), the color varying with temperature of the light source in the image reading unit.

The features and advantages of the present invention will be more apparent from the following detailed description of embodiments taken in conjunction with the accompanying drawings.

In this text, the term "reference value" may refer to any value and/or a function of a value which may represent a property. In this text, the terms "comprising", "comprise", "comprises" and other forms of "comprise" can have the meaning ascribed to these terms in U.S. Patent Law and can mean "including", "include", "includes" and other forms of "include".

Various features of novelty which characterize the invention are pointed out in particularity in the claims annexed to and forming a part of this disclosure. For a better understanding of the invention, its operating advantages and specific objects attained by its uses, reference is made to the accompanying descriptive matter in which embodiments of the invention are illustrated in the accompanying drawings in which corresponding components are identified by the same reference numerals.

BRIEF DESCRIPTION OF THE DRAWINGS

The following detailed description, given by way of example, but not intended to limit the invention solely to the specific embodiments described, may be understood in conjunction with the accompanying drawings, in which:

FIG. 7 is a flowchart illustrating processing of an embodiment in which the image reading device corrects an output value of the;

DETAILED DESCRIPTION OF THE EMBODIMENTS

Reference will now be made in detail to various embodiments of the invention, one or more examples of which are illustrated in the accompanying drawings. Each example is provided by way of explanation of the invention, and is by no way limiting. In fact, it will be apparent to those skilled in the art that various modifications, combinations, additions, deletions and variations can be made in the present invention without departing from the scope or spirit of the present invention. For instance, features illustrated or described as part of one embodiment can be used in another embodiment to yield a still further embodiment. It is intended that the present invention covers such modifications, combinations, additions, deletions, applications and variations that come within the scope of the appended claims and their equivalents.

Hereinafter, an image reading device and an image forming apparatus according to an embodiment will be described with reference to the drawings. In the following embodiments, a multifunction peripheral having one or more functions of a color copier, a scanner, a facsimile, a printer, etc. will be described as an example of the image forming apparatus.

Figure 1:
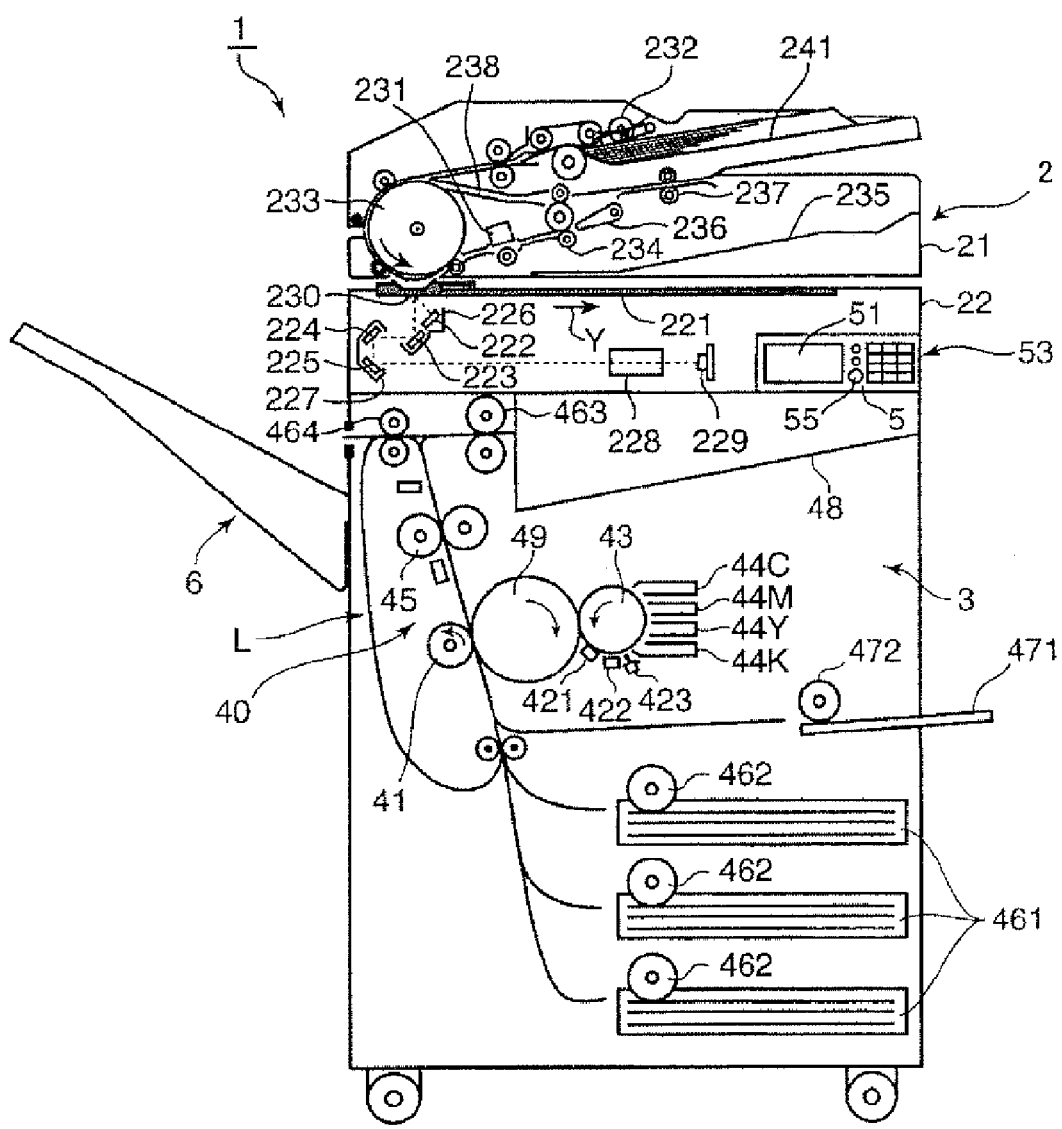
FIG. 1 is a vertical cross-sectional view schematically illustrating an internal configuration of a multifunction peripheral according to an embodiment.

FIG. 1 is a vertical cross-sectional view schematically illustrating an internal configuration of multifunction peripheral 1 according to an embodiment. Multifunction peripheral 1 may include image reading device 2 and apparatus main body 3. As shown in FIG. 1, an embodiment of image reading device 2 may include document conveying unit 21 and scanner unit 22. In some embodiments, document conveying unit 21, may include an automatic document feeder (ADF), having document table 241, feed roller 232, conveying drum 233, discharge roller 234, and output tray 235. Document table 241 may be used as a place on which documents are placed. The documents placed on the document table 241 may be taken in one by one by feed roller 232 and conveyed to conveying drum 233. The documents passed through conveying drum 233 may be discharged by discharge roller 234 to output tray 235.

In some embodiments, scanner unit 22 (serving as an example of an image reading unit) optically reads an image of a document to generate image data. In some embodiments, scanner units include a contact surface, one or more light sources, one or more mirrors, one or more carriages, and one or more image sensors. In an embodiment, image sensors may include but are not limited to a charge-coupled device (hereinafter "CCD"), a complementary metal-oxide-semiconductor (hereinafter "CMOS") imager, any other image device known in the art or a combination thereof. As shown in FIG. 1, scanner unit 22 on apparatus main body 3 includes contact glass plate 221, light source 222, first mirror 223, second mirror 224, third minor 225, first carriage 226, second carriage 227, imaging lens 228, and charge-coupled device (CCD) 229. In some embodiments, scanner unit 22 may include a white fluorescent lamp, such as a cold-cathode fluorescent tube, as light source 222. Light from a document is guided to CCD 229 by first minor 223, second minor 224, third mirror 225, first carriage 226, second carriage 227, and imaging lens 228. In some embodiments, scanner unit 22 may include a white LED as the light source 222.

In an embodiment, contact image sensor (hereinafter "CIS") 231 is disposed downstream of scanner unit 22 in a document conveying direction. On a document conveying path, CIS 231 may be disposed at a position where it can read a surface opposite a document surface read by scanner unit 22 as shown in FIG. 1.

In some embodiments, a document may be placed on contact glass plate 221. In an embodiment, as shown in FIG. 1, light source 222 and first mirror 223 are supported by first carriage 226. The second mirror 224 and the third mirror 225 are supported by the second carriage 227 as shown in FIG. 1. In some embodiments, other embodiments of carriages may be used. For example, the mirrors and light source may be supported by one carriage or multiple carriages.

Document reading methods for image reading device 2 may include a flat-bed reading mode in which scanner unit 22 reads a document placed on contact glass plate 221, and/or an ADF reading mode in which a document is taken in by the ADF and read while being conveyed.

In the flat-bed reading mode, light source 222 may illuminate a document placed on contact glass plate 221. Reflected light corresponding to one line in a main scanning direction is reflected sequentially by the first mirror 223, the second mirror 224, and the third mirror 225 and enters the imaging lens 228. In some embodiments, arrangements of the mirrors and imaging lens and/or the number of mirrors may vary. After entering imaging lens 228, the light may form an image on a light receiving surface of CCD 229. CCD 229 may be a one-dimensional image sensor. CCD 229 may process one line of a document image at one time. Upon completion of reading of one line, in some embodiments, first carriage 226 and second carriage 227 may be moved in a direction (sub-scanning direction indicated by an arrow Y) orthogonal to the main scanning direction, so that the next line is read.

In the ADF reading mode, documents placed on document table 241 are taken in one by one by feed roller 232. As shown in FIG. 1, when a document passes through a reading position 230 on the conveying path from conveying drum 233 to output tray 235, light source 222 illuminates the document. Reflected light corresponding to one line in the main scanning direction is reflected sequentially by first mirror 223, second mirror 224, and third mirror 225 and enters imaging lens 228. After entering imaging lens 228, the light is formed into an image on the light receiving surface of CCD 229. Then, the document may be conveyed by document conveying unit 21 and the next line may be read. Unless otherwise specified, the following description is based on the assumption that documents are automatically fed and their images are read in the ADF reading mode.

As shown in FIG. 1, document conveying unit 21 may include a document reversing mechanism having switching guide 236, reversing rollers 237, and reverse conveying path 238. A document whose front side (one side) has been read in the first ADF reading operation is reversed and conveyed again by the document reversing mechanism, so that the back side (the other side) of the document may be read by an image sensor, such as CCD 229. In some embodiments, the document reversing mechanism may only operate in a double-sided reading operation, and does not operate in a single-sided reading operation. After completion of a single-sided reading operation or after the back side of a document is read in a double-sided reading operation, switching guide 236 is switched to the upper side, so that the document passed through conveying drum 233 is discharged by discharge roller 234 to output tray 235. After the font side of a document is read in a double-sided reading operation, switching guide 236 is switched to the lower side, so that the document passed through conveying drum 233 is conveyed to a nip portion of reversing rollers 237. Then, switching guide 236 is switched to the upper side, and reversing rollers 237 rotate in a reverse direction. Thus, the document is conveyed through reverse conveying path 238 to conveying drum 233 again.

In the ADF reading mode, image reading device 2 as shown in FIG. 1, may be capable of causing CCD 229 to read the front side of a document and causing CIS 231 to read the back side of the document while the document is being conveyed, as described above. That is, after the document is fed from the document table 241, the front side of the document is read by CCD 229 when the document passes through reading position 230, while the back side of the document is read when the document passes through CIS 231. Thus, in an embodiment incorporating CCD 229 and CIS 231, as shown in FIG. 1, both sides of the document can be read by a one-pass operation.

In some embodiments, multifunction peripheral 1 may include, as shown in FIG. 1, apparatus main body 3 and stack tray 6 provided to the left of apparatus main body 3. In some embodiments, apparatus main body 3 may include a plurality of feed cassettes 461, a plurality of feed rollers 462 that convey sheets (recording media) one by one from feed cassettes 461 to recording unit (e.g., image forming unit) 40, and recording unit 40 that forms images on sheets conveyed from feed cassettes 461. In some embodiments, apparatus main body 3 may include manual feed tray 471, on which sheets having a size not accommodated in any of feed cassettes 461, sheets with images on one side only, and any recording media such as overhead projector (OHP) sheets can be placed. In an embodiment, sheets on manual feed tray 471 are fed one by one by feed roller 472 into apparatus main body 3.

An embodiment of recording unit 40 may include charge eliminating unit 421, charging unit 422, developing units 44C, 44M, 44Y, and 44K, transfer drum 49, and a fixing unit 45. In an embodiment, charge eliminating unit 421 may eliminate residual charge from the surface of photosensitive drum 43. In an embodiment, charging unit 422 may charge the surface of photosensitive drum 43 after elimination of any residual charge. An embodiment may include exposure unit 423 that outputs laser light on the basis of image data obtained by scanner unit 22 to expose the surface of photosensitive drum 43 to the laser light so as to form an electrostatic latent image on the surface of the photosensitive drum 43. In some embodiments, developing units 44C, 44M, 44Y, and 44K may form toner images of cyan (C), magenta (M), yellow (Y), and black (K) on photosensitive drum 43 on the basis of the electrostatic latent image. In an embodiment, transfer drum 49 may receive the superimposed toner images of the respective colors formed on photosensitive drum 43. Transfer unit 41 may transfer the resulting toner image on transfer drum 49 to a recording media (e.g., a sheet). In an embodiment, fixing unit 45 may heat the sheet having the toner image to fix the toner image to the sheet. The toners of cyan, magenta, yellow, and black may be supplied from toner supply containers (e.g., toner cartridges) (not shown). In some embodiments, conveying rollers 463 and 464 may convey a sheet passed through recording unit 40 to stack tray 6 or to output tray 48.

In some embodiments, when forming images on both sides of a sheet, an image is formed on one side of the sheet by recording unit 40, and then the sheet is nipped between conveying rollers 463 adjacent to output tray 48. With the sheet being nipped, conveying rollers 463 are reversely rotated, so that the sheet is switched back. The sheet is sent to a conveying path L and conveyed again to an area upstream of recording unit 40. After an image is formed on the other side, the sheet may be discharged to stack tray 6 or to output tray 48.

In some embodiments, on the front of apparatus main body 3, there may be operation unit 5 having a display that allows a user to visually check an operation screen and various messages, and operation buttons that allow the user to input various operation instructions. In an embodiment, operation unit 5 may include display 51 with a touch panel, numerical keypad 53, and start button 55. Display 51 may include, but is not limited to a liquid crystal display (hereinafter "LCD"), an electroluminescent display (hereinafter "ELD") or any other display known in the art. In some embodiments, display 51 may display a selection screen which allows the user to select properties including, but not limited to a sheet size, a scaling factor, a density, etc.

Figure 2:
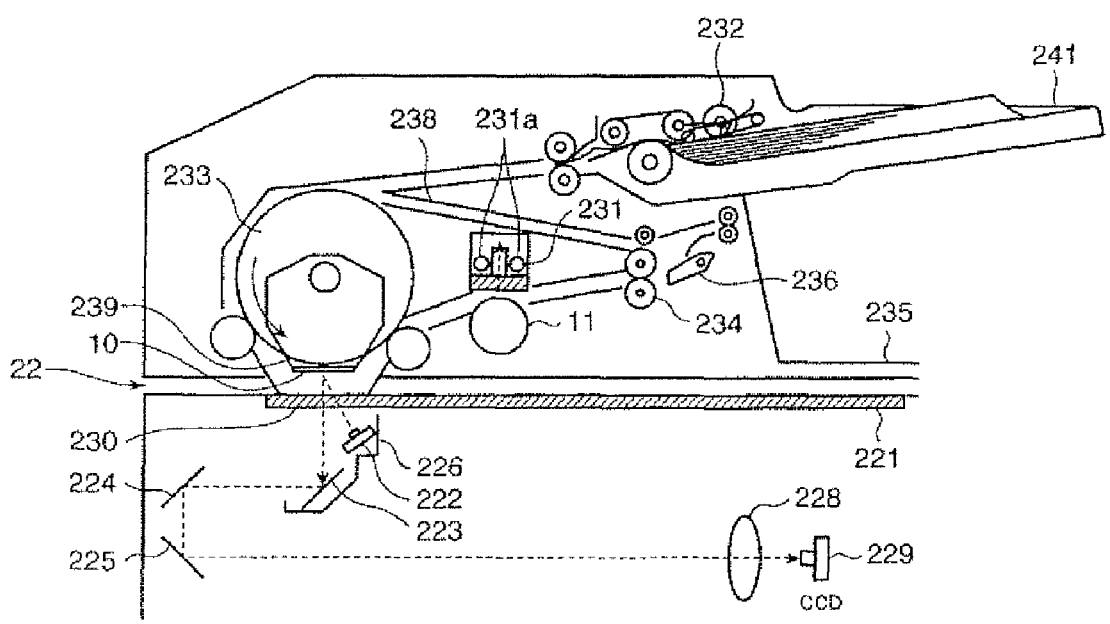
FIG. 2 is a schematic side view illustrating an image reading device of the multifunction peripheral according to the embodiment.

FIG. 2 is a schematic side view illustrating an embodiment of image reading device 2 of multifunction peripheral 1. In some embodiments, scanner unit 22 may perform an image reading operation to read an image of white reference plate 10. An embodiment of an image reading device, as shown in FIG. 2, as image reading device 2 may include white reference plate 10 (serving as an example of a white reference member) disposed at a position opposite reading position 230 of scanner unit 22. As shown in FIG. 2, a document conveyed to reading position 230 may pass between white reference plate 10 and contact glass plate 221. In some embodiments, white reference plate 10 is a white strip member extending in the main scanning direction (orthogonal to the plane of FIG. 2) and attached to platen board 239. In some embodiments, the scanner unit may read an image of the white reference plate to correct for luminous intensity. For example, when reading an image of white reference plate 10 for correction of luminous intensity (described below), scanner unit 22 reads a white surface of white reference plate 10 in a state where first carriage 226 and second carriage 227 are moved to the position of white reference plate 10 in the sub-scanning direction (i.e., to the reading position 230 at which a document conveyed by document conveying unit 21 is read) and light source 222 illuminates the white surface of white reference plate 10.

In some embodiments, CIS 231 includes light sources 231a which may illuminate a document. In an embodiment, shading roller 11 is disposed at a position opposite a document reading position of the CIS 231.

Figure 3:
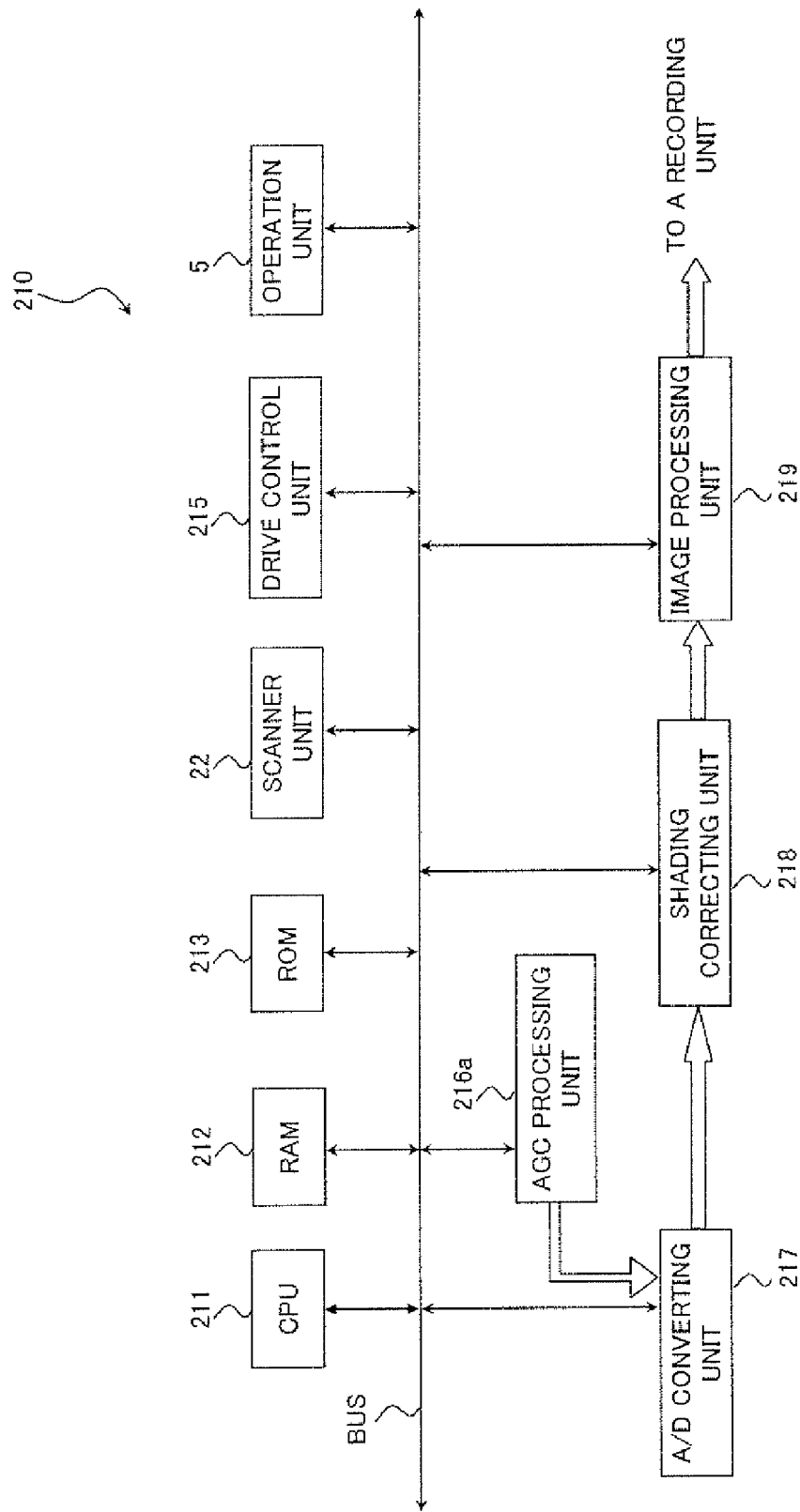
FIG. 3 is a block diagram illustrating a schematic configuration of an image reading circuit of an image reading device according to multiple embodiments.

FIG. 3 is a block diagram illustrating a schematic configuration of an image reading circuit of image reading device 2. As shown in FIG. 3, an embodiment of image reading circuit 210 of image reading device 2 may include central processing unit (hereinafter "CPU") 211, random-access memory (hereinafter "RAM") 212, read-only memory (hereinafter "ROM") 213, drive control unit 215, operation unit 5, automatic gain control (hereinafter "AGC") processing unit 216a, analog-to-digital (hereinafter "A/D") converting unit 217, shading correcting unit 218, and image processing unit 219. These components of image reading circuit 210 may be coupled such that they can communicate with each other via a bus (hereinafter "BUS").

In some embodiments, CPU 211 is a control mechanism that may control an overall operation of multifunction peripheral 1. In an embodiment, CPU 211 may control an operation of image reading device 2. CPU 211 may control the operation of multifunction peripheral 1 and image reading device 2 according to an operation control program for multifunction peripheral 1 and image reading device 2. The operation control program may be stored in ROM 213 or a hard disk drive (hereinafter "HDD") (not shown).

In some embodiments, RAM 212 may be a storage mechanism and may serve as a work area for CPU 211. In some embodiments, CPU 211 uses RAM 212 as a work area to control the operations of multifunction peripheral 1 and image reading device 2 according to the operation control program described above.

In an embodiments, ROM 213 may store programs, such as the operation control program etc.

In some embodiments, drive control unit 215 may control the operation of drive mechanisms for scanner unit 22 and CIS 231. In an embodiment, the drive control unit may configured to perform a document image reading operation and an image reading operation for correction of luminous intensity (described below). In some embodiments, drive control unit 215 may control the operation for turning on and off light source 222 and light sources 231a. Additionally, drive control unit 215 may control the amount of light emitted by light source 222 by varying a drive current value for light source 222.

In some embodiments, operation unit 5 may accept various operation instructions, such as an instruction for starting a copying operation and others, from an operator.

In an embodiment, A/D converting unit 217 may convert read image data composed of analog electric signals into digital image data. For example, A/D converting unit 217 may convert read image data composed of analog electric signals sent out from CCD 229 of scanner unit 22 and/or CIS 231 into digital image data. In an embodiment, after converting read image data obtained from AGC processing unit 216a, A/D converting unit 217 outputs the resulting digital image data to shading correcting unit 218.

In some embodiments, shading correcting unit 218 may use a reference value to perform shading correction on each of the document images read by the scanner unit and the CIS. For example, shading unit 218 may use a white reference value and/or a black reference value to perform shading correction on each of the document images read by scanner unit 22 and CIS 231. In some embodiments, the white reference value and the black reference value may be obtained by a reading operation performed on white reference plate 10 by scanner unit 22, or a reading operation performed with shading roller 11 by CIS 231. In an embodiment, shading correcting unit 218 may send out data of the shading-corrected document images to image processing unit 219. In some embodiments, data of the image read by scanner unit 22 is input to shading correcting unit 218 after being processed by AGC processing unit 216a and A/D converting unit 217.

In some embodiments, image processing unit 219 may perform various types of image processing on image data sent out from shading correcting unit 218. For example, image processing unit 219 may perform correction processing including, but not limited to level correction, gamma correction, compression or expansion of the image data, image enlargement or reduction, any correction processing known in the art and/or combinations thereof. After the image processing, the resulting image data may be used for image formation in recording unit 40.

AGC processing unit 216a may perform processing (described in detail below) for calculating a drive current value for light source 222. In some embodiments, the drive current value may be varied according to changes in chromaticity of an image read by scanner unit 22. In some embodiments, by performing automatic gain control (hereinafter "AGC") using a gain that is corrected according to changes in luminous intensity of light source 222, AGC processing unit 216a may perform processing for correcting an output value of CCD 229 to a value corresponding to a stored reference value representing a luminous intensity (described below).

Figure 4:
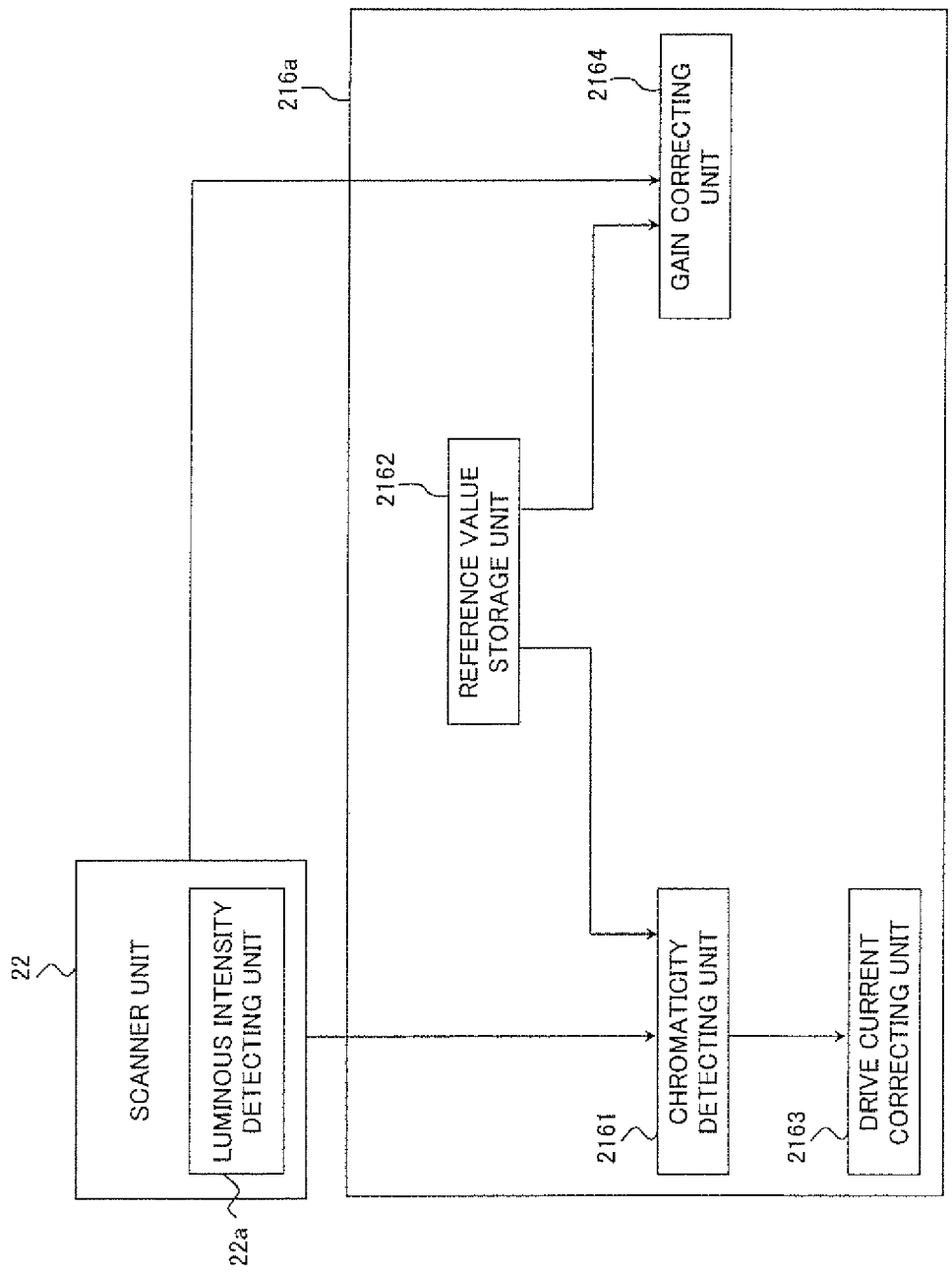
FIG. 4 is a block diagram illustrating an internal configuration of an automatic gain control (AGC) processing unit.

FIG. 4 is a block diagram illustrating an embodiment of an internal configuration of the AGC processing unit 216a.

In an embodiment, AGC processing unit 216a may include chromaticity detecting unit 2161, reference value storage unit 2162, drive current correcting unit 2163, and gain correcting unit 2164.

In some embodiments, chromaticity detecting unit 2161 may detect chromaticity of an image of white reference plate 10 read by scanner unit 22. In some embodiments, a scanner unit may have a color filter. For example, scanner unit 22 may have a color filter, with which scanner unit 22 color-separates data of the read image of white reference plate 10 into RGB data and sends out the RGB data to chromaticity detecting unit 2161. In some embodiments, chromaticity detecting unit 2161 may convert the RGB data received from scanner unit 22 into chromaticity (x,y). For example, the chromaticity detecting unit may convert the RGB data by calculation using a known conversion formula. On the basis of the resulting chromaticity (x,y), chromaticity detecting unit 2161 may detect chromaticity of the read image of the surface of white reference plate 10.

In some embodiments, reference value storage unit 2162 may store, as reference values, the chromaticity of an image of white reference plate 10 read by the scanner unit 22 and the luminous intensity of light source 222 at a predetermined normal temperature (e.g., 25° C.). For example, based on an operator's instruction input from operation unit 5, drive control unit 215 drives scanner unit 22 at the time of manufacture or shipment of scanner unit 22 such that scanner unit 22 reads an image of white reference plate 10 at the predetermined normal temperature (i.e., in an initial state before a continuous reading operation is performed). The read image of white reference plate 10 may be color-separated by scanner unit 22 into RGB data, converted into chromaticity (x,y) by chromaticity detecting unit 2161, and stored in reference value storage unit 2162 as a reference value representing chromaticity.

In some embodiments, an operator may input instructions at an operation unit. Thus, in some embodiments, based on an operator's instruction input from operation unit 5, drive control unit 215 may drive light source 222 of scanner unit 22 at the time of manufacture or shipment of scanner unit 22 such that luminous intensity detecting unit 22a detects luminous intensity of light source 222 at the predetermined normal temperature. In some embodiments, information about the luminous intensity of light source 222 is sent out from luminous intensity detecting unit 22a to reference value storage unit 2162 and stored in reference value storage unit 2162 as a reference value representing the luminous intensity of light source 222.

In some embodiments, drive current correcting unit 2163 may calculate the amount of change between the reference value representing chromaticity stored in reference value storage unit 2162 and chromaticity detected by chromaticity detecting unit 2161 during operation of scanner unit 22. According to the calculated amount of change, drive current correcting unit 2163 may correct a drive current value that drive control unit 215 uses to drive light source 222.

In some embodiments, a luminous intensity detecting unit may be included in the scanner unit. In some embodiments, the luminous intensity detecting unit 22a may detect luminous intensity of light source 222.

As shown in FIG. 4, an embodiment may include gain correcting unit 2164 which calculates a gain according to the amount of change between the reference value representing luminous intensity stored in reference value storage unit 2162 and luminous intensity detected by luminous intensity detecting unit 22a after the drive current value is corrected by drive current correcting unit 2163. By performing automatic gain control using the calculated gain, in an embodiment gain correcting unit 2164 may correct an output value from CCD 229 to a value corresponding to the luminous intensity stored as a reference value. Gain correcting unit 2164 may include an AGC circuit (not shown). In an embodiment, gain correcting unit 2164 may use a corrected gain to perform appropriate control (gain adjustment), such as signal amplification, on an image signal obtained by photoelectric conversion performed by CCD 229 of scanner unit 22. Then, gain correcting unit 2164 may output the gain-adjusted signal to A/D converting unit 217. In some embodiments, the adjustment of the gain may include illuminating a reference plate with light from a light source, and correcting the amplitude of a signal indicating an output value (luminous intensity) obtained from the reflected light by the CCD to a value several times the original amplitude so that the output value becomes a predetermined value (e.g., reference value representing a luminous intensity). For example, the adjustment of the gain used in AGC processing performed by the AGC circuit may include illuminating the white reference plate 10 with light from the light source 222, and correcting the amplitude of a signal indicating an output value (luminous intensity) obtained from the reflected light by the CCD 229 to a value several times the original amplitude so that the output value becomes a predetermined value (e.g., reference value representing luminous intensity stored in the reference value storage unit 2162 for the CCD 229 described below).

Figure 5:
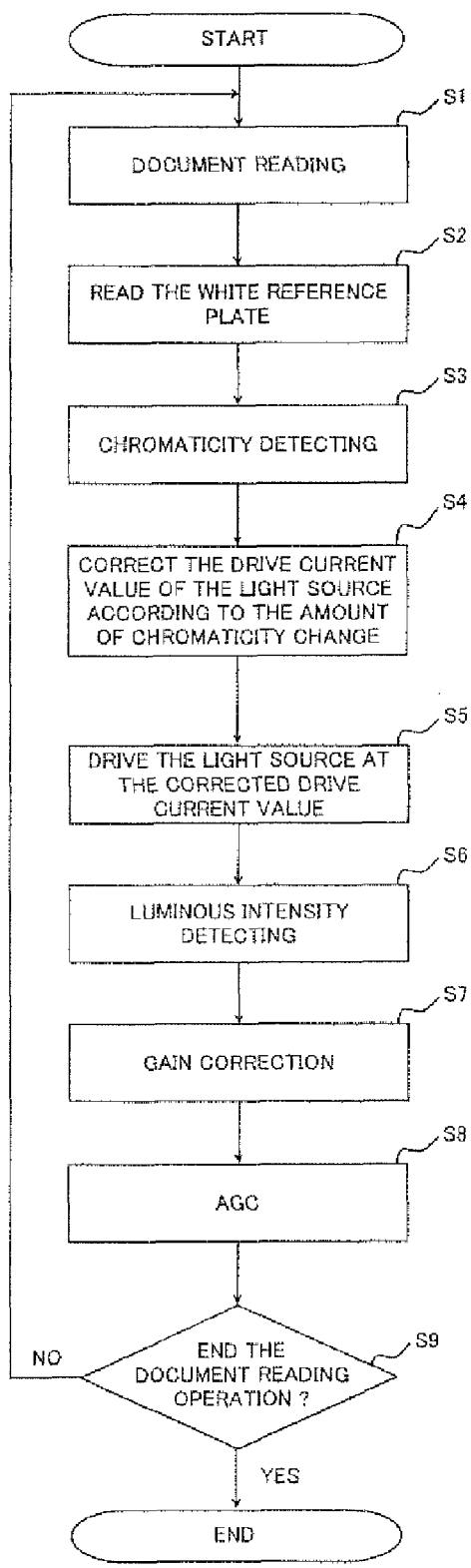
FIG. 5 is a flowchart illustrating processing of an embodiment in which the image reading device corrects an output value of a charge-coupled device (CCD)

FIG. 5 is a flowchart illustrating processing of an embodiment in which the image reading device may correct an output value of the CCD. For example, image reading device 2 may correct an output value of CCD 229.

In some embodiments, during execution of a copying operation initiated in response to an copying operation execution instruction input from operation unit 5 by the operator, document conveying unit 21 starts conveying documents on document table 241 one by one toward reading position 230 of scanner unit 22, so that a document reading operation starts (step S1). As depicted in FIG. 2, before the leading end of a document reaches the reading position 230, drive control unit 215 (shown in FIG. 3) causes scanner unit 22 to turn on light source 222 using a drive current value set by drive current correcting unit 2163 (shown in FIG. 4) at this point and read an image of the white reference plate 10 (step S2 of FIG. 5). In an embodiment, in which the document is a second document or any following document, after the trailing end of an already read document passes through the reading position and before the leading end of the next document to be read reaches the reading position, the drive control unit may read an image of the reference plate (step S2 of FIG. 5).

As shown in step S3 of FIG. 5, next the chromaticity of the image of the reference plate read by the scanner unit is detected. For example, chromaticity detecting unit 2161 detects chromaticity of the image of white reference plate 10 read by the scanner unit 22. As described above, data of the read image of the white reference plate 10 may be color-separated into RGB data by a color filter of scanner unit 22 and sent to the chromaticity detecting unit 2161. On the basis of data of chromaticity (x,y) obtained by converting the RGB data, the chromaticity detecting unit 2161 may determine the chromaticity of the read image of the white reference plate 10.

After detection of the chromaticity in step S3 of FIG. 5, drive current correcting unit 2163 calculates the amount of change between the reference value representing chromaticity stored in reference value storage unit 2162 and the chromaticity detected by chromaticity detecting unit 2161 in step S3. According to the calculated amount of change, drive current correcting unit 2163 may change a drive current value drive control unit 215 uses to drive the light source 222 (step S4). For example, if a white LED is used as the light source, if the white LED is driven to illuminate continuously, the temperature of the white LED alone increases. This characteristic of the white LED causes chromaticity to change in a negative direction. In such embodiments, drive current correcting unit 2163 may reduce the drive current value for the white LED by a value corresponding to the amount of reduction of the chromaticity from the reference value, so as to increase the chromaticity to the reference value. This may correct for variations in color of read images caused by increased temperature of the white LED during continuous operation of scanner unit 22. Thus, in some embodiments, regardless of changes in temperature of the white LED, the chromaticity of images read by scanner unit 22 can be kept constant.

In some embodiments, the drive control unit may use the drive current value to turn on the light source as shown in step S5 of FIG. 5. For example, as shown in FIGS. 3-4, drive control unit 215 may use the drive current value newly set by the drive current correcting unit 2163 to turn on the light source 222 and drive the scanner unit 22 (step S5). In some embodiments, scanner unit 22 may read an image of the document illuminated by light source 222 driven at the drive current value newly set. As described in step S6 of FIG. 5, the luminous intensity may be detected at the same time. For example, as shown in FIG. 4, luminous intensity detecting unit 22a of the scanner unit 22 detects luminous intensity of the light source 222 (shown in FIG. 2) that illuminates by being driven at the drive current value newly set (step S6).

In some embodiments, the gain correcting unit may adjust for a gain according to the amount of change between the stored reference value representing luminous intensity and the luminous intensity detected in step S6 of FIG. 5. For example, as shown in FIG. 4, gain correcting unit 2164 may calculate a gain corresponding to the amount of change between the luminous intensity stored in the reference value storage unit 2162 as a reference value and the luminous intensity detected in step S6 by the luminous intensity detecting unit 22a (step S7 of FIG. 5).

In some embodiments, adjusting for gain using the calculated gain may increase an output value from the CCD. For example, by performing automatic gain control using the calculated gain, gain correcting unit 2164 (FIG. 4) increases an output value output from CCD 229 (FIG. 2) of scanner unit 22 to a value corresponding to the luminous intensity stored as a reference value (step S8 of FIG. 5). In some embodiments, according to the amount of reduction in luminous intensity of light source 222 caused by the reduced drive current value, gain correcting unit 2164 may increase the amplitude of a signal of the output value output from CCD 229 of the scanner unit 22. For example, the output value may be raised to an output value corresponding to the luminous intensity stored as a reference value. At this point, the output value sent out from CCD 229 (FIG. 2) to the A/D converting unit 217 (FIG. 3) becomes an output value obtained by automatic gain control using the above-described gain. For example, the read image of the document on which a reading operation is performed in step S1 may become the data of the output value obtained by automatic gain control using the above-described gain.

As shown in step S9 of FIG. 5, a determination is then made as to whether all documents on the document table have been read. For example, drive control unit 215 determines whether all the documents placed on the document table 241 have been read. In some embodiments, processing of steps S1 to S8 of FIG. 5 is repeated until the drive control unit determines that all the documents have been read (step S9).

Figure 6:
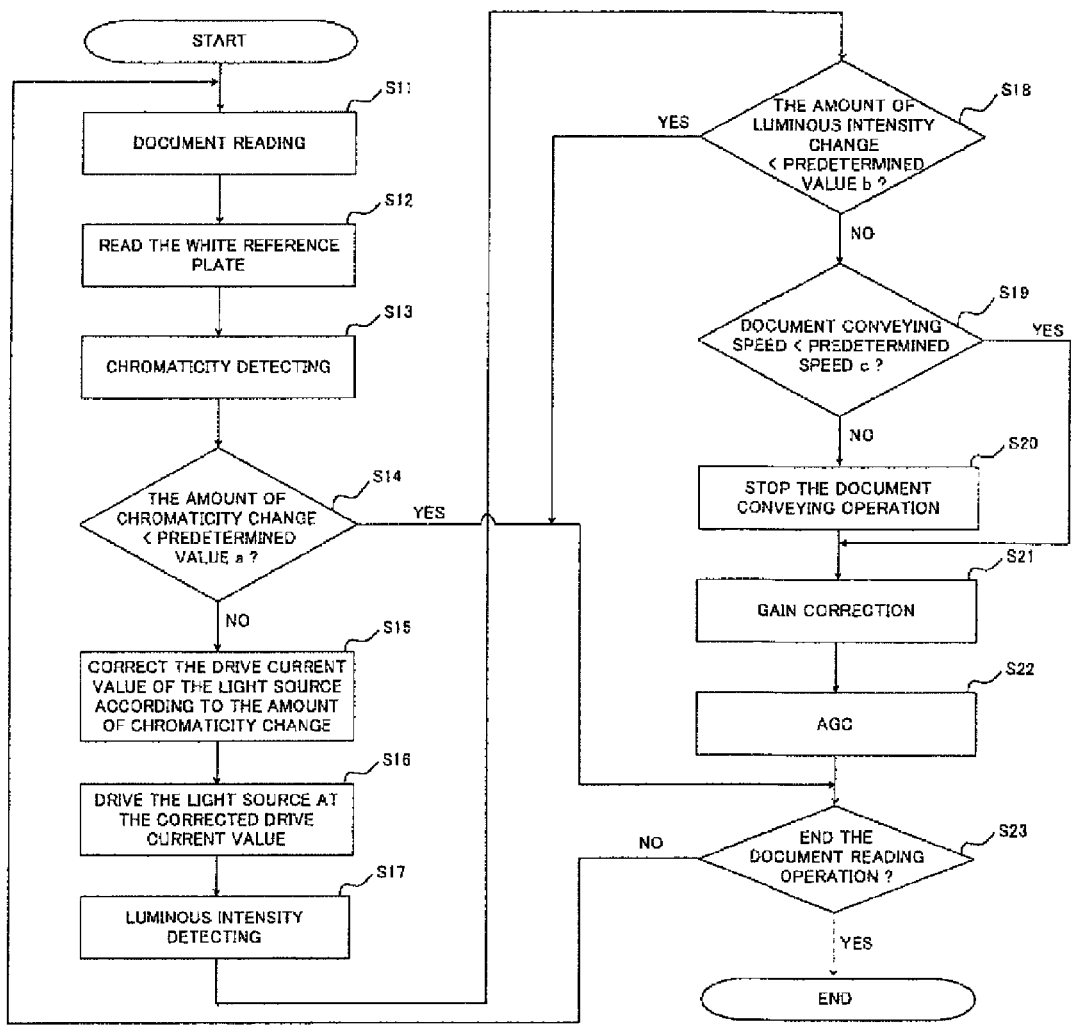
FIG. 6 is a flowchart illustrating processing of an embodiment in which the image reading device corrects an output value of the CCD.

In some embodiments, an image reading device may adjust and/or correct an output value of the CCD. FIG. 6 is a flowchart illustrating processing of an embodiment in which the image reading device corrects and/or adjusts an output value of the CCD. In such an embodiment, processing may differ from the processing described herein above.

In an embodiment depicted in FIG. 6, a drive current correcting unit may determine whether a difference between chromaticity detected by the chromaticity detecting unit and chromaticity stored in the reference value storage unit as a reference value (i.e., the amount of chromaticity change from the reference value) is smaller than a predetermined value "a" (step S14). For example, as shown in FIG. 4 drive current correcting unit 2163 may determine whether a difference between chromaticity detected by the chromaticity detecting unit 2161 and chromaticity stored in the reference value storage unit 2162 as a reference value (i.e., the amount of chromaticity change from the reference value) is smaller than a predetermined value "a" (step S14). The predetermined value "a" indicates the amount of chromaticity change that is assumed to affect image quality. If this amount of change is as small as a predetermined level, drive current correcting unit 2163 does not correct the drive current value for the light source 222. For example if the amount of change is less than about a value for "a", the drive correcting unit may not correct a drive current value for the light source.

For example, if the amount of chromaticity change is smaller than the predetermined value "a" (YES in step S14), the processing of steps S15 to S22 for correcting the output value of the CCD 229 may not performed, and the processing may proceed to step S23.

In some embodiments, if the amount of chromaticity change is greater than or equal to the predetermined value "a" (NO in step S14), the drive current value for the light source 222 is corrected (step S15), the light source 222 is driven at the corrected drive current value (step S16), and luminous intensity of the light source 222 is detected by the luminous intensity detecting unit 22a (step S17).

After the luminous intensity is detected by the luminous intensity detecting unit 22a in step S17, the gain correcting unit 2164 may determine whether a difference between the luminous intensity detected by the luminous intensity detecting unit 22a and luminous intensity stored in the reference value storage unit 2162 as a reference value (i.e., the amount of luminous intensity change from the reference value) is smaller than a predetermined value "b" (step S18). The predetermined value "b" indicates the amount of luminous intensity change that is assumed to affect image quality. If this amount of change is as small as a predetermined level, the gain correcting unit 2164 does not perform gain correction and automatic gain control.

If the amount of luminous intensity change is smaller than the predetermined value "b" (YES in step S18), the processing of steps S19 to S22 for correcting the output value of the CCD 229 is not performed, and the processing proceeds to step S23.

In some embodiments, if the amount of luminous intensity change is greater than or equal to the predetermined value "b" (NO in step S18), the gain correcting unit 2164 may determine, on the basis of speed information obtained from the drive control unit 215, whether the document conveying speed of the document conveying unit 21 is lower than a predetermined value "c" (step S19). The speed indicated by the predetermined value "c" is a document conveying speed that is relatively high. At this speed, the duration from the time when the trailing end of one document reaches the reading position 230 to the time when the leading end of the next document reaches the reading position 230 (i.e., sheet interval) is short. This means that without stopping the document conveying operation, it may be difficult to perform gain correction and automatic gain control during the sheet interval.

If the gain correcting unit 2164 determines that the document conveying speed of the document conveying unit 21 is lower than the predetermined value "c" (YES in step S19), the drive control unit 215 does not stop the document conveying operation performed by the document conveying unit 21, and the gain correcting unit 2164 performs gain correction (step S21) and automatic gain control (step S22).

If the gain correcting unit 2164 determines that the document conveying speed of the document conveying unit 21 is higher than or equal to the predetermined value "c" (NO in step S19), the drive control unit 215 causes the document conveying unit 21 to stop conveying the document (step S20), and then the gain correcting unit 2164 performs gain correction (step S21) and automatic gain control (step S22). This is to ensure processing time for gain correction (step S21) and automatic gain control (step S22) during each sheet interval, and thus to reflect the output value of the CCD 229, the output value being processed in steps S21 and S22, in the document image read by the scanner unit 22 in step S11.

FIG. 7 is a flowchart illustrating processing of an embodiment in which the image reading device corrects an output value of the CCD. Next, a description will be given about processing of an embodiment in which the image reading device 2 corrects an output value of the CCD 229. In this embodiment, processing differs from the processing described herein above.

In some embodiments, processing as described above may be combined with additional processing. For example, after the gain correcting unit 2164 determines that the document conveying speed of the document conveying unit 21 is higher than or equal to the predetermined value "c" (NO in step S39 of FIG. 7), gain correcting unit 2164 further determines whether a difference between the luminous intensity detected by luminous intensity detecting unit 22a and a stored reference value representing luminous intensity (i.e., the amount of luminous intensity change from the reference value) is smaller than a predetermined value "d" (step S40). The predetermined value "d" indicates the amount of luminous intensity change that has a relatively small impact on image quality and is greater than the predetermined value "b".

If the gain correcting unit 2164 determines that the amount of luminous intensity change from the reference value is smaller than the predetermined value "d" (YES in step S40), then drive control unit 215 does not stop the document conveying operation performed by the document conveying unit 21 and allows the scanner unit 22 to continue performing the document reading operation. Thus, gain correction (step S42) and automatic gain control (step S43) are not performed.

In an embodiment, if gain correcting unit 2164 determines that the amount of luminous intensity change from the reference value is greater than or equal to the predetermined value "d" (NO in step S40), the drive control unit 215 stops the document conveying operation performed by the document conveying unit 21 (step S41), and the gain correcting unit 2164 performs gain correction (step S42) and automatic gain control (step S43).

Thus, in an embodiment where the calculated amount of luminous intensity change is small, priority may be given to the speed of document reading operation, so that the document reading operation is performed quickly and smoothly. In some embodiments, if there is a considerable change in luminous intensity, priority is given to image quality. Specifically, if the calculated amount of luminous intensity change reaches the predetermined value "d", the document reading operation is stopped and the gain correction and the automatic gain control are performed.

Figure 8:
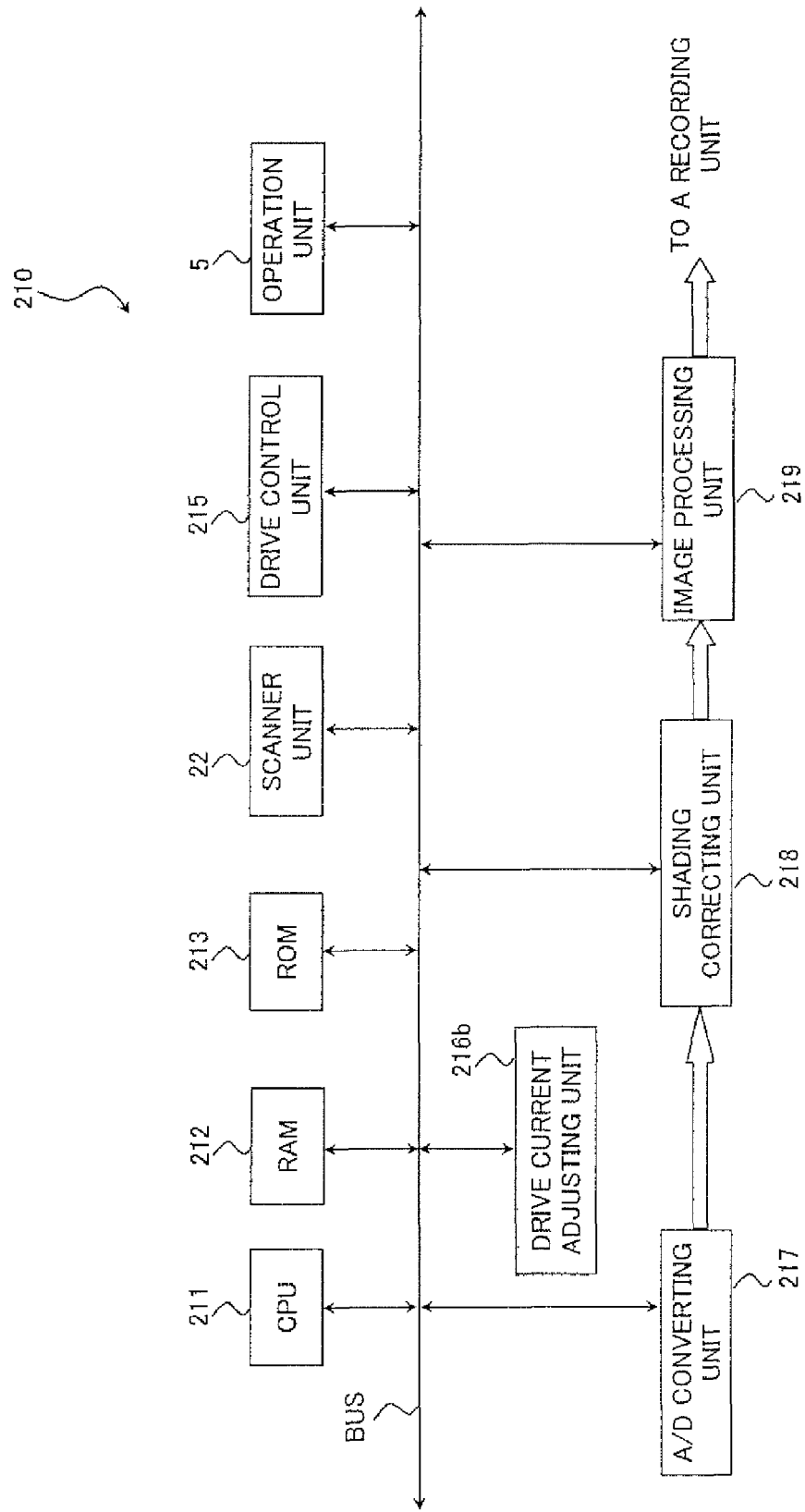
FIG. 8 is a block diagram illustrating a schematic configuration of an image reading circuit of an image reading device according to one or more embodiments.

FIG. 8 is a block diagram illustrating a schematic configuration of an image reading circuit of the image reading device 2 according to an embodiment. As shown in FIG. 8, an embodiment of image reading circuit 210 of the image reading device may include CPU 211, RAM 212, ROM 213, drive control unit 215, operation unit 5, drive current adjusting unit 216b, A/D converting unit 217, shading correcting unit 218, and image processing unit 219. These components of image reading circuit 210 are connected such that they can communicate with each other via the bus "BUS".

A basic configuration of the image reading circuit 210 shown in FIG. 8 is the same as that of the image reading circuit 210 illustrated in FIG. 3.

In some embodiments, drive current adjusting unit 216b may perform processing for calculating a drive current value for the light source 222. For example, the drive current value may be varied according to changes in chromaticity of an image read by the scanner unit.

A/D converting unit 217, shown in FIG. 8, may convert read image data composed of analog electric signals sent out from CCD 229 (shown in FIG. 2) of the scanner unit 22 and CIS 231 (shown in FIG. 2) into digital image data. After the A/D conversion, A/D converting unit 217 outputs the resulting digital image data to the shading correcting unit 218.

In some embodiments, shading correcting unit 218 of FIG. 8 may use a white reference value and a black reference value to perforin shading correction on each of the document images read by scanner unit 22 and CIS 231 (shown in FIG. 2). The white reference value and the black reference value are obtained by a reading operation performed on the white reference plate 10 by the scanner unit 22, or a reading operation performed with the shading roller 11 by the CIS 231 shown in FIG. 2. Shading correcting unit 218 sends out data of the shading-corrected document images to image processing unit 219. In an embodiment, data of the image read by scanner unit 22 is input to shading correcting unit 218 after being processed by A/D converting unit 217.

An embodiment may include image processing unit 219 of FIG. 8 which performs various types of image processing on image data sent out from shading correcting unit 218. For example, image processing unit 219 performs correction processing including, but not limited to level correction, gamma correction, compression or expansion of the image data, image enlargement or reduction, any correction processing known in the art and/or combinations thereof. After the image processing, the resulting image data may be used for image formation in recording unit 40.

Figure 9:
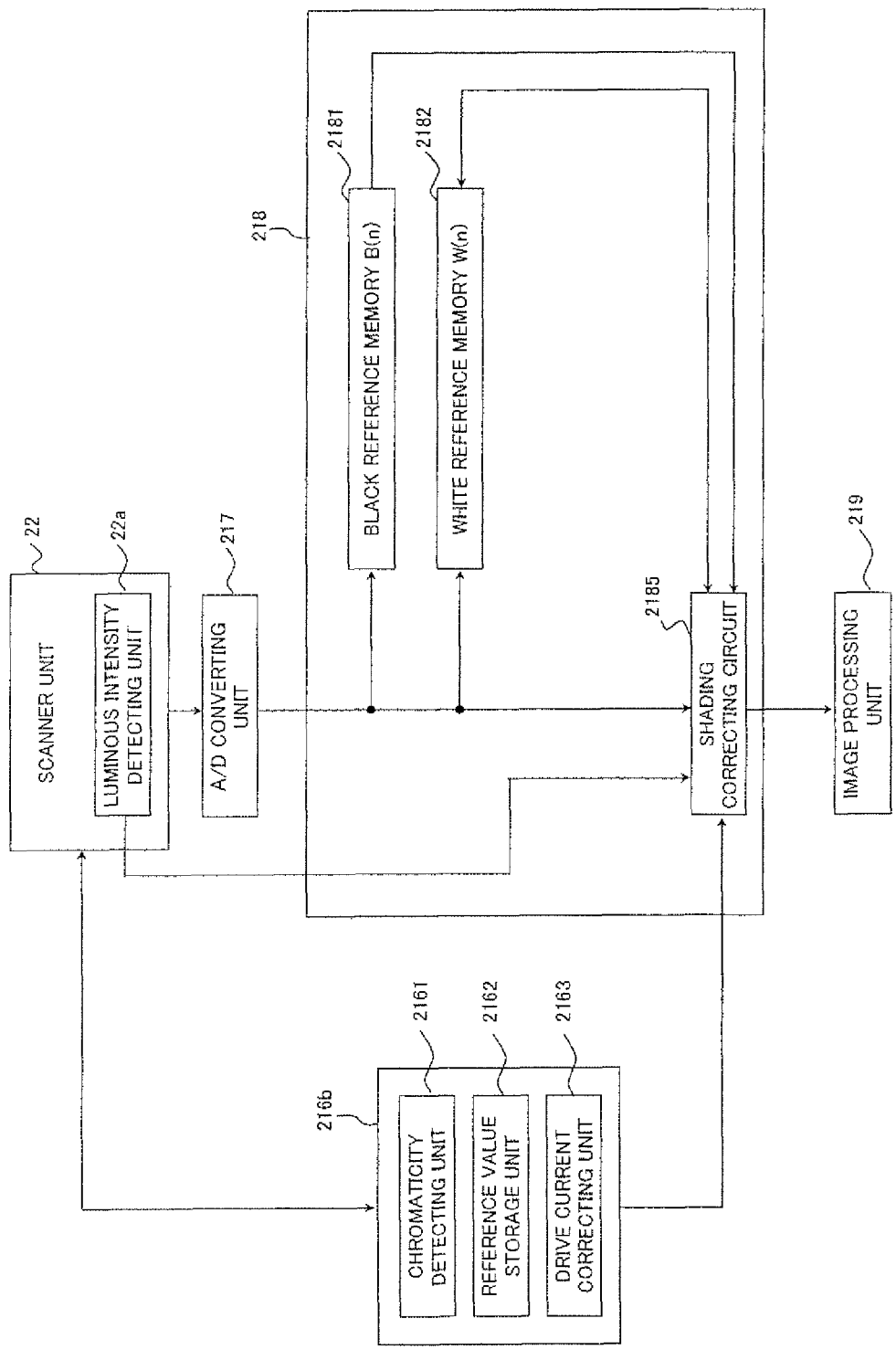
FIG. 9 is a block diagram illustrating internal configurations of a drive current adjusting unit and a shading correcting unit.

FIG. 9 depicts a block diagram illustrating internal configurations of the drive current adjusting unit and the shading correcting unit. Next, internal configurations of the drive current adjusting unit 216b and the shading correcting unit 218 will be described.

In some embodiments, drive current adjusting unit 216b may include chromaticity detecting unit 2161, reference value storage unit 2162, and drive current correcting unit 2163 as shown in FIG. 9.

In some embodiments, chromaticity detecting unit 2161 detects chromaticity of an image of white reference plate 10 read by the scanner unit 22 (shown in FIG. 2). In an embodiment, scanner unit 22 may include a color filter. With the color filter, scanner unit 22 may color-separate data of the read image of white reference plate 10, the read image being an image read by scanner unit 22 to obtain a white reference value for color detection, into RGB data and sends out the RGB data to the chromaticity detecting unit 2161. In some embodiments, chromaticity detecting unit 2161 converts the RGB data received from scanner unit 22 into chromaticity (x,y), for example, by calculation using a known conversion formula. On the basis of the resulting chromaticity (x,y), chromaticity detecting unit 2161 detects chromaticity of the read image of the surface of white reference plate 10.

In some embodiment, reference value storage unit 2162 stores, as reference values, the chromaticity of an image of the white reference plate read by the scanner unit and the luminous intensity of the light source at a predetermined normal temperature (e.g., 25° C.). For example, based on an operator's instruction input from operation unit 5, drive control unit 215 drives scanner unit 22 at the time of manufacture or shipment of scanner unit 22 such that scanner unit 22 reads an image of white reference plate 10 at the predetermined normal temperature (i.e., in an initial state before a continuous reading operation is performed). In some embodiments, the read image of the white reference plate 10 is color-separated by the scanner unit into RGB data, converted into chromaticity (x,y) by chromaticity detecting unit 2161, and stored in reference value storage unit 2162 as a reference value of chromaticity.

In some embodiments, based on an operator's instruction input from operation unit 5, drive control unit 215 drives light source 222 of scanner unit 22 at the time of manufacture or shipment of the scanner unit, such that luminous intensity detecting unit 22a detects luminous intensity of the light source 222 at the predetermined normal temperature (shown in FIG. 1). In an embodiment, information about the luminous intensity of light source 222 is sent out from luminous intensity detecting unit 22a to reference value storage unit 2162 and stored in reference value storage unit 2162 as a reference value of luminous intensity of light source 222.

In some embodiments, drive current correcting unit 2163 calculates the amount of change between the chromaticity stored in reference value storage unit 2162 as a reference value and chromaticity detected by chromaticity detecting unit 2161 during operation of scanner unit 22. According to the calculated amount of change, drive current correcting unit 2163 may correct or adjust a drive current value the drive control unit 215 uses to drive light source 222.

An embodiment includes luminous intensity detecting unit 22a in the scanner unit 22. Luminous intensity detecting unit 22a detects luminous intensity of light source 222.

In some embodiments, shading correcting unit 218 may include black reference memory 2181, white reference memory 2182, and shading correcting circuit 2185 as shown in FIG. 9.

In an embodiment, black reference memory 2181 may store black reference values B(n) for shading correction. The black reference values B(n) may be obtained by scanner unit 22 and CIS 231 (shown in FIG. 2).

In an embodiment, white reference memory 2182 stores white reference values W(n) for shading correction. The white reference values W(n) may be obtained by the scanner unit 22 and CIS 231.

In some embodiments, shading correcting circuit 2185 uses a black reference value and a white reference value to perform shading correction on a document image read by scanner unit 22 or CIS 231. The black reference value and the white reference value are obtained by a reading operation performed on white reference plate 10 by scanner unit 22, or a reading operation performed with shading roller 11 by CIS 231. For example, in the case of 256 levels of gray, shading correcting circuit 2185 uses Equation (1) below to perform image processing and calibrate image data. In Equation (1), "input image data value (I_out)" is data of shading-corrected document image, and "input actual data (I_in)" is data of an actual document image read by scanner unit 22 or CIS 231.

$$\text{Input image data value}(I\_out) = 256 \times (\text{input actual data }(I\_in) - \text{black reference value } B(n)) \div (\text{white reference value } W(n) - \text{black reference value } B(n)) \quad \text{Equation (1)}$$

In some embodiments, an image read by scanner unit 22 may be adjusted and/or corrected by shading correcting circuit 2185 performing the following shading correction. In an embodiment, during the shading correction described above, shading correcting circuit 2185 calculates the amount of change between a reference value representing luminous intensity stored in the reference value storage unit 2162 and luminous intensity detected by luminous intensity detecting unit 22a after the drive current value for light source 222 is corrected by drive current correcting unit 2163. According to the calculated amount of change, shading correcting circuit 2185 corrects the white reference value and overwrites the existing white reference value in white reference memory 2182 with the corrected white reference value as a white reference value W(n) for shading correction. Then, shading correcting circuit 2185 uses the corrected white reference value to perform shading correction on the image read by scanner unit 22.

Figure 10:
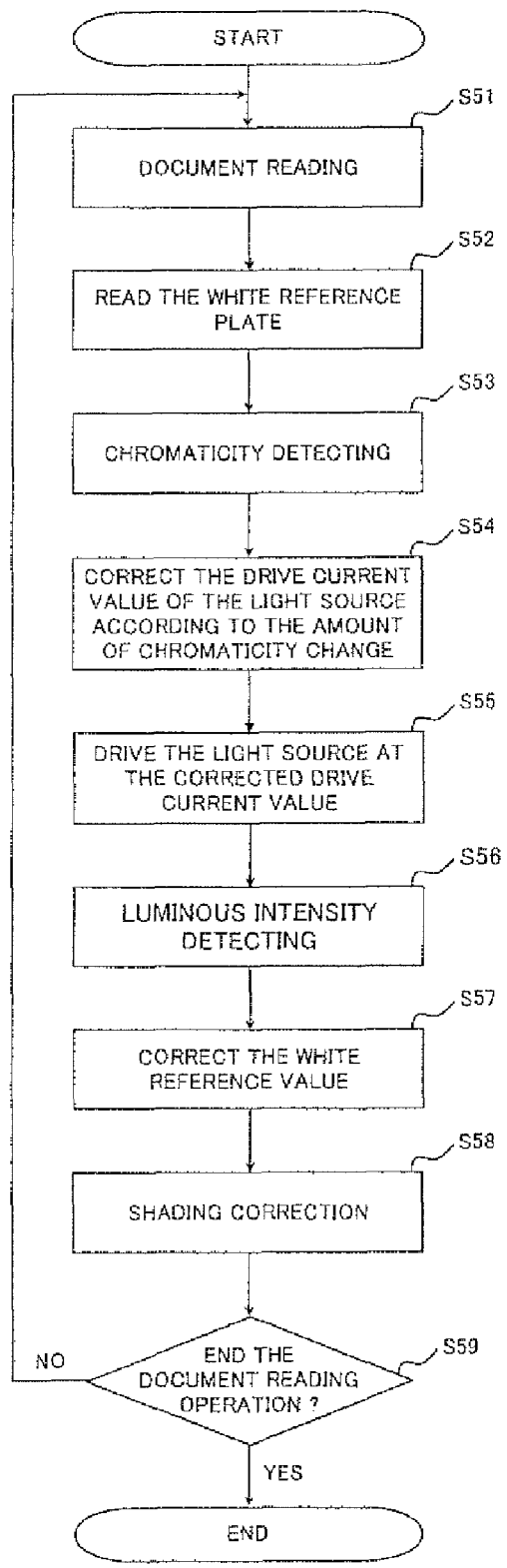
FIG. 10 is a flowchart illustrating processing of an embodiment in which the image reading device performs shading correction on an image read by a scanner unit.

FIG. 10 is a flowchart illustrating processing of an embodiment in which the image reading device performs shading correction on an image read by the scanner unit. In an embodiment, processing of an image read by the scanner unit may include shading adjustment and/or shading correction by the image reading device For example, during execution of a copying operation initiated in response to an copying operation execution instruction input from operation unit 5 by the operator, document conveying unit 21 starts conveying documents on document table 241 one by one toward reading position 230 of scanner unit 22, so that a document reading operation starts (step S51 of FIG. 10). As depicted in FIG. 2, before the leading end of a document reaches reading position 230, drive control unit 215 (shown in FIG. 3) causes scanner unit 22 to turn on light source 222 using a drive current value set by drive current correcting unit 2163 (shown in FIG. 4) at this point and read an image of the white reference plate 10 (step S2 of FIG. 5). In an embodiment, in which the document is a second document or any following document, after the trailing end of an already read document passes through the reading position and before the leading end of the next document to be read reaches the reading position, the drive control unit may read an image of the reference plate (step S52 of FIG. 10).

In some embodiments, the chromaticity detecting unit may detect chromaticity of the image of the white reference plate read by the scanner unit (step S53). As described above, in an embodiment, data of the read image of the white reference plate 10 may be color-separated into RGB data by the color filter of scanner unit 22 and sent to chromaticity detecting unit 2161. On the basis of data of chromaticity (x,y) obtained by converting the RGB data, the chromaticity detecting unit may determine the chromaticity of the read image of the white reference plate.

In some embodiments, after detection of the chromaticity in step S53, the drive current correcting unit 2163 calculates the amount of change between the chromaticity stored in the reference value storage unit 2162 as a reference value and the chromaticity detected by the chromaticity detecting unit 2161 in step S53. According to the calculated amount of change, drive current correcting unit 2163 varies and/or corrects a drive current value used by drive control unit 215 to drive the light source 222 (step S54). For example, when a white LED is used as the light source, if the white LED is driven to illuminate continuously, the temperature of the white LED alone increases. This characteristic of the white LED causes chromaticity to change in a negative direction. In an embodiment, the drive current correcting unit reduces the drive current value for the white LED by a value corresponding to the amount of reduction of the chromaticity from the reference value, so as to increase the chromaticity to the reference value. This adjustment may correct variations in color of read images caused by increased temperature of the white LED during continuous operation of the scanner unit. Thus, regardless of changes in temperature of the white LED, the chromaticity of images read by the scanner unit can be kept constant.

In some embodiments, the drive control unit uses the drive current value newly set by the drive current correcting unit to turn on the light source and drive the scanner unit (step S55 of FIG. 10). In an embodiment, the scanner unit reads an image of the document illuminated by the light source driven at the drive current value newly set. At the same time, the luminous intensity detecting unit of the scanner unit detects luminous intensity of the light source that illuminates by being driven at the drive current value newly set (step S56).

In some embodiments, shading correcting circuit 2185 (shown in FIG. 9) may correct the white reference value according to the amount of change between the a reference value representing luminous intensity stored in the reference value storage unit 2162 and the luminous intensity detected by the luminous intensity detecting unit 22a in step S56 (step S57). For example, shading correcting circuit 2185 reduces the white reference value by the amount of reduction in luminous intensity of light source 222, the luminous intensity being reduced by changing the drive current value. Then, shading correcting circuit 2185 overwrites the existing white reference value in white reference memory 2182 with the corrected white reference value as a white reference value W(n).

In an embodiment, shading correcting circuit 2185 of FIG. 9 performs shading correction using the new white reference value W(n) (step S58) to increase the white level of the image read by scanner unit 22 to a level corresponding to the stored reference value representing luminous intensity. At this point, data of the image read by scanner unit 22 becomes the data that is shading-corrected using the new white reference value W(n). The shading-corrected data is sent out from shading correcting unit 218 to image processing unit 219.

In an embodiment, drive control unit 215 may then determine whether all the documents placed on the document table 241 have been read. The processing of steps S51 to S58 is repeated until the drive control unit 215 determines that all the documents have been read (step S59).

Figure 11:
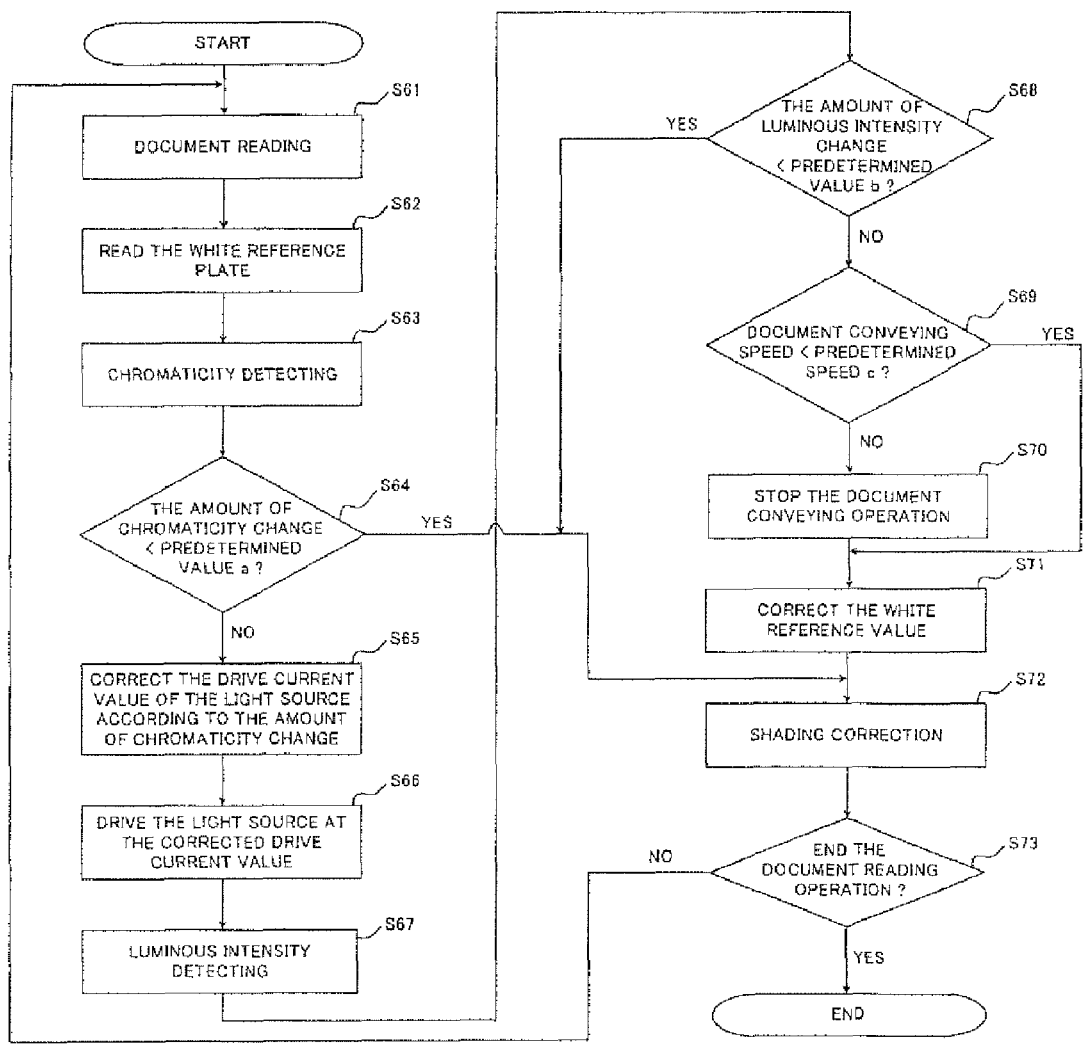
FIG. 11 is a flowchart illustrating processing of an embodiment in which the image reading device performs shading correction on an image read by the scanner unit according to an embodiment.

An embodiment may include an image reading device which perform is shading correction on an image read by the scanner unit. FIG. 11 is a flowchart illustrating processing of an embodiment in which image reading device 2 performs shading correction on an image read by scanner unit 22. Processing similar may differ from embodiments previously discussed herein.

In an embodiment, drive current correcting unit 2163 may determine whether a difference between chromaticity detected by the chromaticity detecting unit 2161 and a reference value representing chromaticity stored in the reference value storage unit 2162 (i.e., the amount of chromaticity change from the reference value) is smaller than a predetermined value "a" (step S64). The predetermined value "a" indicates the amount of chromaticity change that is assumed to affect image quality. If this amount of change is as small as a predetermined level, the drive current correcting unit 2163 does not correct the drive current value for the light source 222. For example if the amount of change is less than about a value for "a", the drive correcting unit may not correct a drive current value for the light source.

For example, if the amount of chromaticity change is smaller than the predetermined value "a" (YES in step S64), the processing of steps S65 to S71 is not performed, and the processing proceeds to step S72.

In some embodiments, if the amount of chromaticity change is greater than or equal to the predetermined value "a" (NO in step S64), the drive current value for the light source 222 is corrected (step S65), the light source 222 is driven at the corrected drive current value (step S66), and luminous intensity of the light source 222 is detected by the luminous intensity detecting unit 22a (step S67).

After the luminous intensity is detected by the luminous intensity detecting unit 22a in step S67, the shading correcting circuit 2185 may determine whether a difference between the luminous intensity detected by the luminous intensity detecting unit 22a and a reference value representing a luminous intensity stored in the reference value storage unit 2162 (i.e., the amount of luminous intensity change from the reference value) is smaller than a predetermined value "b" (step S68). The predetermined value "b" indicates the amount of luminous intensity change that is assumed to affect image quality. If this amount of change is as small as a predetermined level, the shading correcting circuit 2185 does not perform various types of processing necessary for the shading correction.

If the amount of luminous intensity change is smaller than the predetermined value "b" (YES in step S68), the processing of steps S69 to S71 is not performed, and the processing proceeds to step S72.

In some embodiments, if the amount of luminous intensity change is greater than or equal to the predetermined value "b" (NO in step S68), the shading correcting circuit 2185 may determine, on the basis of speed information obtained from the drive control unit 215, whether the document conveying speed of the document conveying unit 21 is lower than a predetermined value "c" (step S69). The speed indicated by the predetermined value "c" is a document conveying speed that is relatively high. At this speed, the duration from the time when the trailing end of one document reaches the reading position 230 to the time when the leading end of the next document reaches the reading position 230 (i.e., sheet interval) is short. This means that without stopping the document conveying operation, it may be difficult to perform correction of the white reference value and various types of processing necessary for the correction of the white reference value during the sheet interval.

If the shading correcting circuit 2185 determines that the document conveying speed of the document conveying unit 21 is lower than the predetermined value "c" (YES in step S69), the drive control unit 215 does not stop the document conveying operation performed by the document conveying unit 21, and the shading correcting circuit 2185 corrects the white reference value (step S71) and performs shading correction (step S72).

If the shading correcting circuit 2185 determines that the document conveying speed of the document conveying unit 21 is higher than or equal to the predetermined value "c" (NO in step S69), the drive control unit 215 causes the document conveying unit 21 to stop conveying the document (step S70), and then the shading correcting circuit 2185 corrects the white reference value (step S71) and performs shading correction (step S72). This is to ensure processing time for various types of processing necessary for the shading correction during each sheet interval, and thus to reflect the shading correction of step S72 in the document image read by the scanner unit 22 in step S61.

Figure 12:
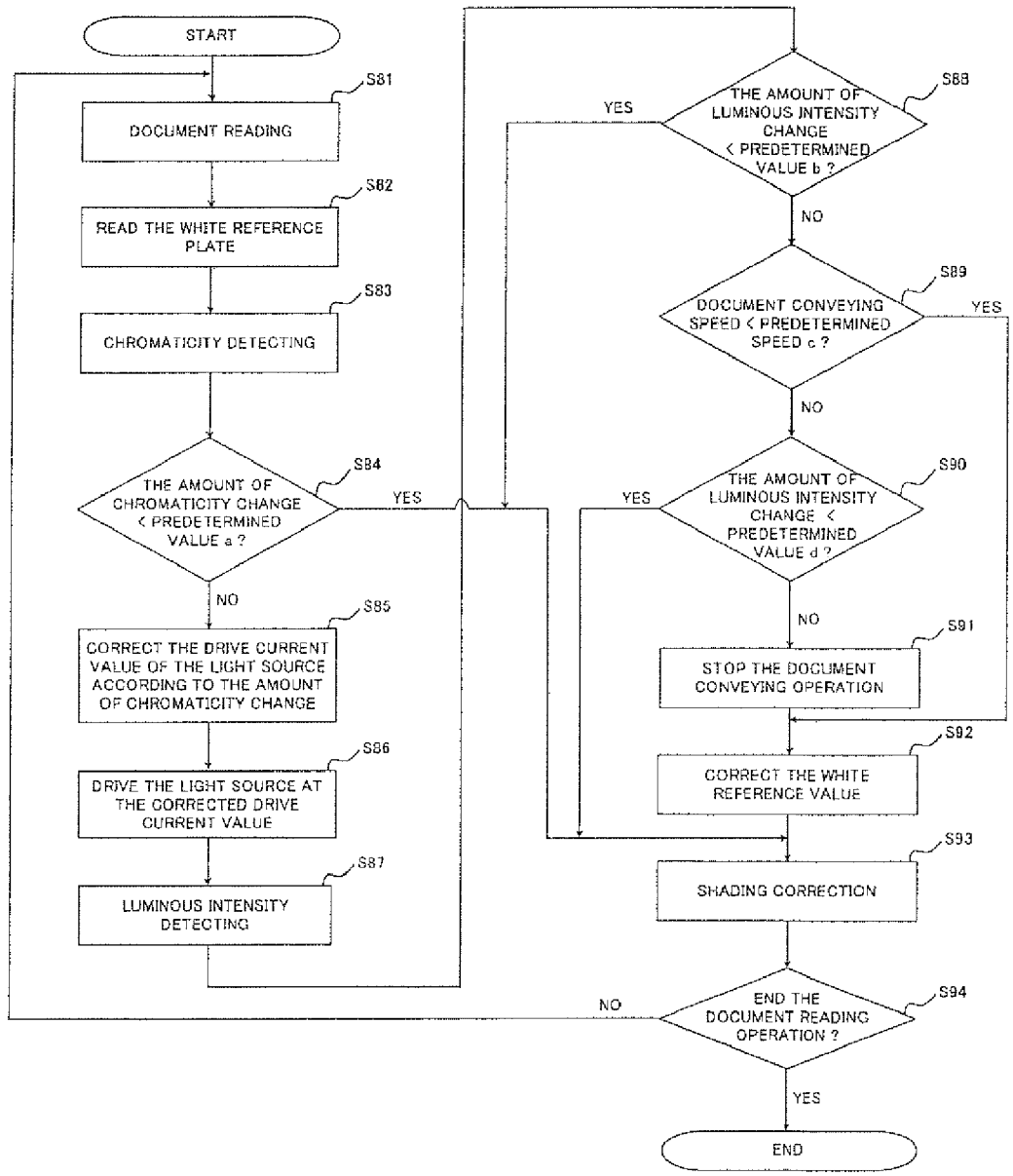
FIG. 12 is a flowchart illustrating processing of an embodiment in which the image reading device performs shading correction on an image read by the scanner unit according to an embodiment.

In an embodiment, the image reading device may perform a shading correction and/or adjustment on an image read by scanner unit FIG. 12 depicts a flowchart illustrating processing of an embodiment in which the image reading device 2 performs shading correction on an image read by the scanner unit 22.

In an embodiment, after shading correcting circuit 2185 determines that the document conveying speed of document conveying unit 21 is higher than or equal to the predetermined value "c" (NO in step S89), shading correcting circuit 2185 further determines whether a difference between the luminous intensity detected by luminous intensity detecting unit 22a and the luminous intensity stored as a reference value (i.e., the amount of luminous intensity change from the reference value) is smaller than a predetermined value "d" (step S90). The predetermined value "d" indicates the amount of luminous intensity change that has a relatively small impact on image quality and is greater than the predetermined value "b".

If, in an embodiment, shading correcting circuit 2185 determines that the amount of luminous intensity change from the reference value is smaller than the predetermined value "d" (YES in step S90), drive control unit 215 does not stop the document conveying operation performed by the document conveying unit 21 and allows the scanner unit 22 to continue performing the document reading operation. Correction of the white reference value (step S92) is not performed.

In some embodiments, if shading correcting circuit 2185 determines that the amount of luminous intensity change from the reference value is greater than or equal to the predetermined value "d" (NO in step S90), drive control unit 215 stops the document conveying operation performed by document conveying unit 21 (step S91), and shading correcting circuit 2185 corrects the white reference value (step S92).

In some embodiments, if the calculated amount of luminous intensity change is small, priority is given to the speed of document reading operation and the correction of the white reference value is not performed, so that the document reading operation is performed quickly and smoothly. On the other hand, if there is a considerable change in luminous intensity, priority is given to image quality. Specifically, if the calculated amount of luminous intensity change reaches the predetermined value "d", the document reading operation is stopped, so that the correction of the white reference value is performed and the shading correction is performed using the corrected white reference value.

Figure 13:
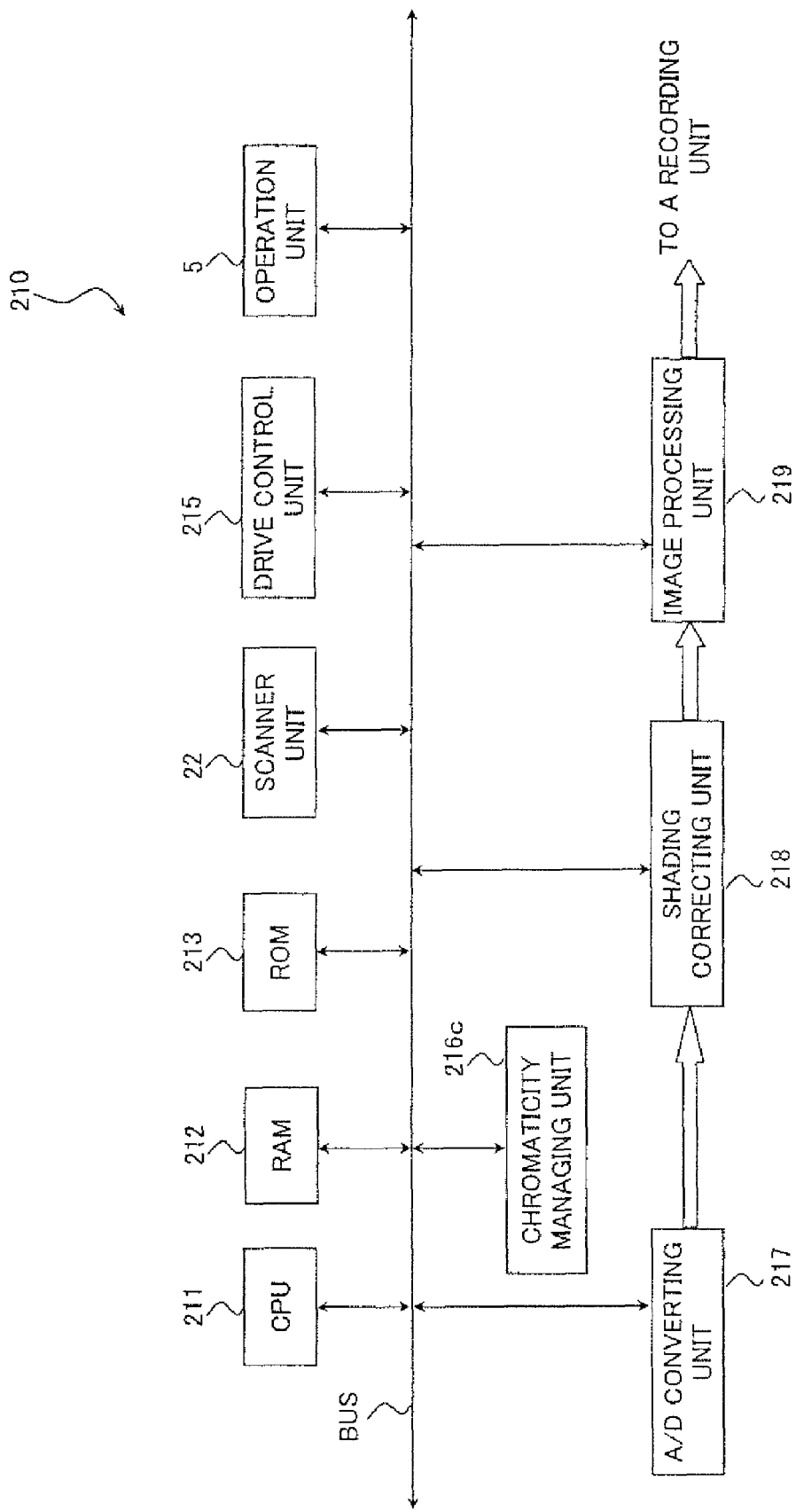
FIG. 13 is a block diagram illustrating a schematic configuration of an image reading circuit of an image reading device according to multiple embodiments.

FIG. 13 depicts a block diagram illustrating a schematic configuration of an image reading circuit of the image reading device 2 according to an embodiment. The image reading circuit 210 of the image reading device may include CPU 211, RAM 212, ROM 213, drive control unit 215, operation unit 5, chromaticity managing unit 216c, A/D converting unit 217, shading correcting unit 218, and image processing unit 219. These components of image reading circuit 210 are connected such that they can communicate with each other via the bus "BUS".

A basic configuration of image reading circuit 210 is the same as that of the image reading circuit 210 illustrated in FIG. 3 and FIG. 8.

In an embodiment, drive control unit 215 controls operations of drive mechanisms for scanner unit 22 and CIS 231 necessary to perform a document image reading operation and an image reading operation for color correction (described below).

In some embodiments, scanner unit 22 uses its internal color filter to color-separate the data of read images of the document and white reference plate 10 into RGB data, and outputs the RGB data to A/D converting unit 217.

As shown in FIG. 13, chromaticity managing unit 216c detects chromaticity during operation of scanner unit 22, and calculates the amount of chromaticity change between the detected chromaticity and a reference value representing chromaticity stored in advance.

In an embodiment, A/D converting unit 217 may convert read image data composed of analog electric signals sent out from CCD 229 of scanner unit 22 and CIS 231 into digital image data. A/D converting unit 217 outputs the resulting digital image data to shading correcting unit 218.

The shading correcting unit 218 uses a white reference value and a black reference value to perform shading correction on each of the document images read by the scanner unit 22 and the CIS 231. The white reference value and the black reference value are obtained by a reading operation performed on the white reference plate 10 by the scanner unit 22, or a reading operation performed with the shading roller 11 by the CIS 231. The shading correcting unit 218 sends out data of the shading-corrected document images to image processing unit 219. In an embodiment, data of the image read by the scanner unit 22 is input to the shading correcting unit 218 after being processed by the A/D converting unit 217.

In an embodiment, an image processing unit may perform various types of image processing on image data sent out from the shading correcting unit. For example, the image processing unit may perform correction processing including, but not limited to level correction, gamma correction, compression or expansion of the image data, image enlargement or reduction, any correction processing known in the art and/or combinations thereof. Additionally, in an embodiment, to correct a reduction in chromaticity associated with an increase in temperature of the light source (e.g., white LED) caused by continuous operation etc. of the scanner unit, the image processing unit selects an appropriate correction factor according to the amount of chromaticity change calculated by the chromaticity detecting unit (described below). Then, the image processing unit may perform color correction processing on an image read by the scanner unit (e.g., RGB image data) using the selected correction factor. After the image processing, the resulting image data is used for image formation in the recording unit.

Figure 14:
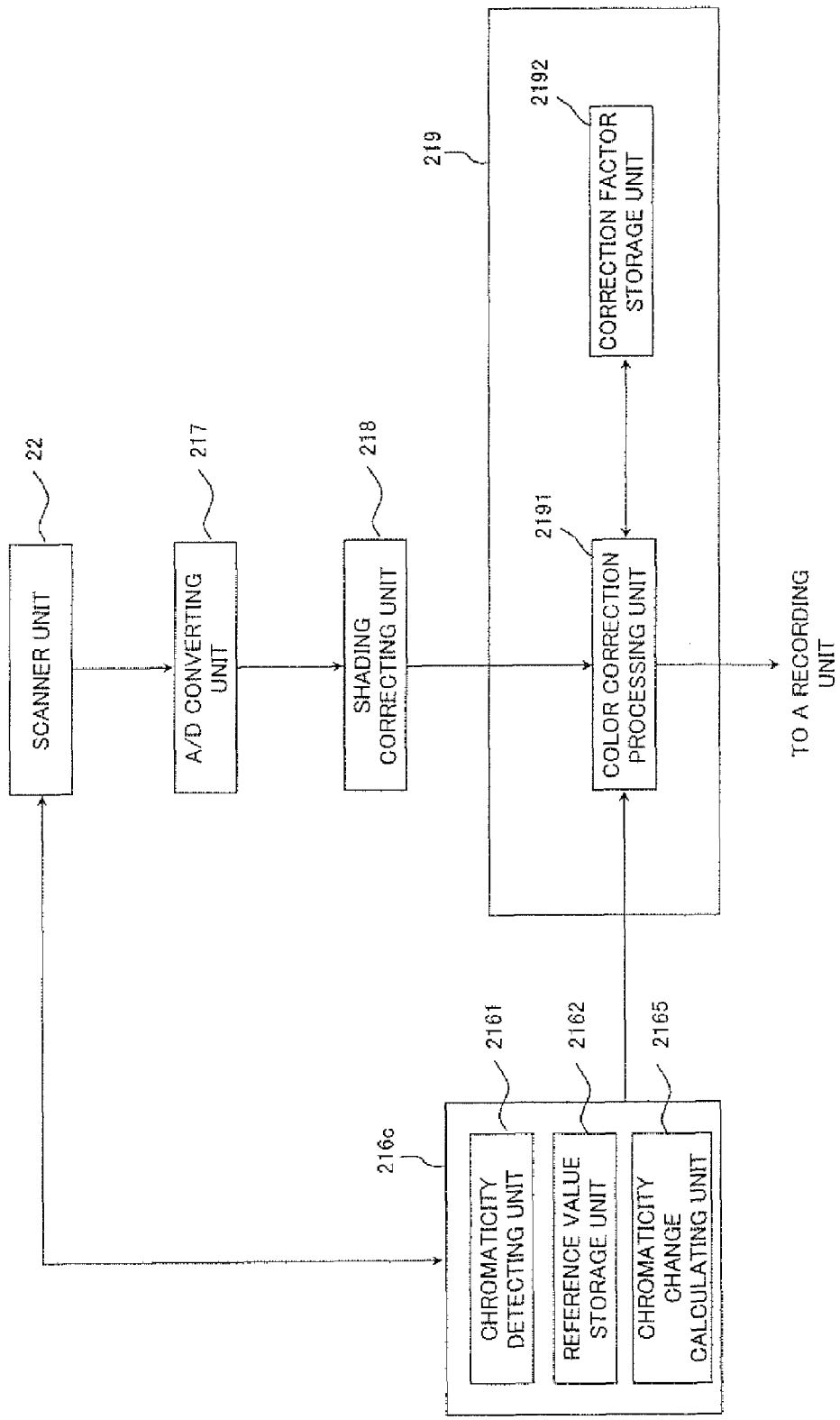
FIG. 14 is a block diagram illustrating internal configurations of a chromaticity managing unit and an image processing unit.

FIG. 14 is a block diagram illustrating internal configurations of chromaticity managing unit 216c and image processing unit 219.

In some embodiments, chromaticity managing unit 216c may include chromaticity detecting unit 2161, reference value storage unit 2162, and chromaticity change calculating unit 2165.

In an embodiment, chromaticity detecting unit 2161 may measure chromaticity of an image of white reference plate 10 read by scanner unit 22. In some embodiments, scanner unit 22 has a color filter. With the color filter, scanner unit 22 may color-separate data of the read image of white reference plate 10, the read image being an image read by scanner unit 22 to obtain a white reference value for color detection, into RGB data and sends out the RGB data to chromaticity detecting unit 2161. Chromaticity detecting unit 2161 may convert the RGB data received from scanner unit 22 into chromaticity (x,y), for example, by calculation using a known conversion formula. On the basis of the resulting chromaticity (x,y), chromaticity detecting unit 2161 may determine chromaticity of the read image on the surface of white reference plate 10.

In some embodiments, reference value storage unit 2162 stores, as a reference value, the chromaticity of an image of white reference plate 10 read by scanner unit 22 at a predetermined normal temperature (e.g., 25° C.). For example, based on an operator's instruction input from operation unit 5, drive control unit 215 drives scanner unit 22 at the time of manufacture or shipment of scanner unit 22 such that scanner unit 22 reads an image of white reference plate 10 at the predetermined normal temperature (i.e., in an initial state before a continuous reading operation is performed). In some embodiments, the read image of white reference plate 10 may be color-separated by scanner unit 22 into RGB data, converted into chromaticity (x,y) by chromaticity detecting unit 2161, and stored in reference value storage unit 2162 as a reference value of chromaticity.

In some embodiments, chromaticity change calculating unit 2165 may calculate the amount of chromaticity change between the chromaticity stored in reference value storage unit 2162 as a reference value and the chromaticity detected by chromaticity detecting unit 2161 during operation of scanner unit 22. In an embodiment, chromaticity change calculating unit 2165 may then send out the calculated amount of chromaticity change to color correction processing unit 2191 of image processing unit 219.

An embodiment of image processing unit 219 may include color correction processing unit 2191 and correction factor storage unit 2192 as shown in FIG. 14.

In some embodiments, color correction processing unit 2191 performs color correction processing on data of a read image output from scanner unit 22 (e.g., RGB image data).

Figure 15:
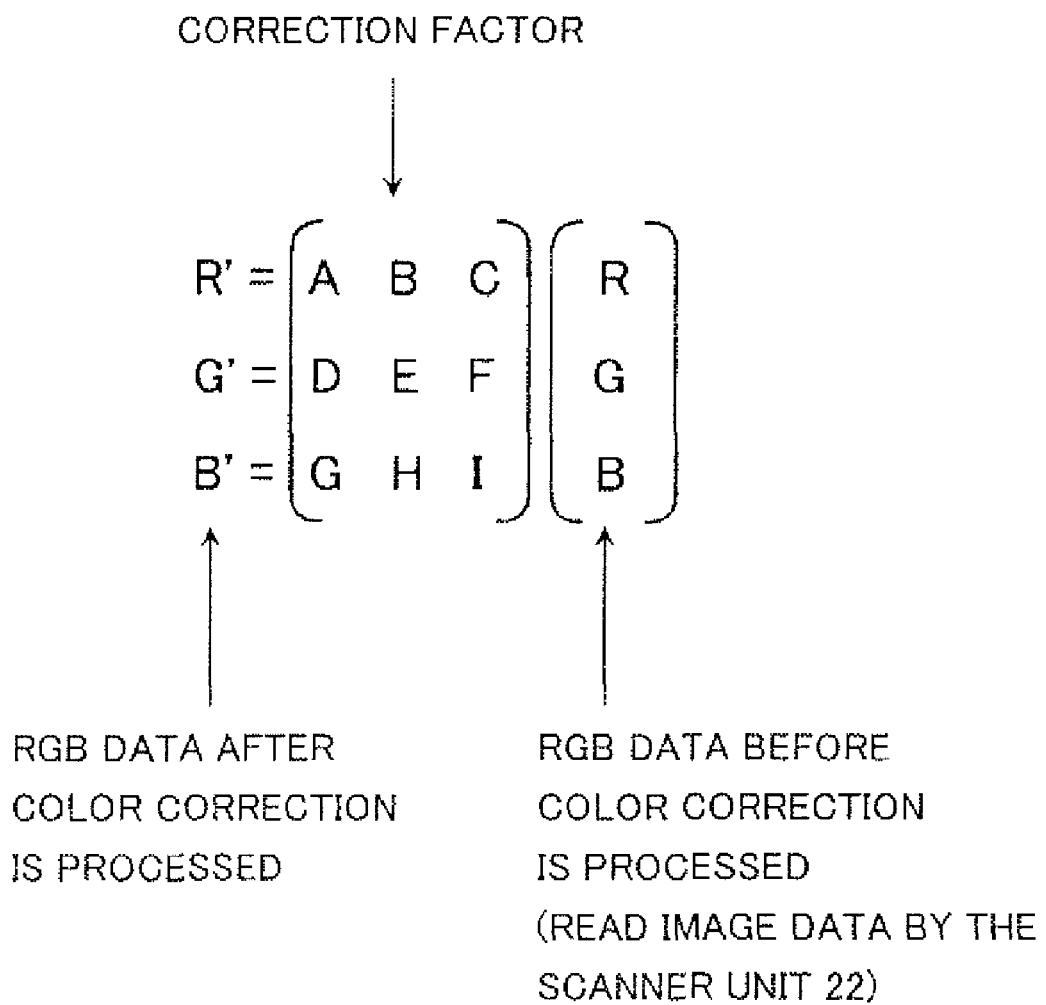
FIG. 15 shows a correction factor used in color correction.

Embodiments of correction factor storage unit 2192 may store a correction factor (see FIG. 15) that color correction processing unit 2191 uses to perform the above-described correction processing on data of an image read by scanner unit 22. The correction factor may be a value corresponding to the amount of each chromaticity change detected by chromaticity detecting unit 2161. For example, correction factor storage unit 2192 may store correction factors corresponding to the respective amounts of chromaticity change. In some embodiments, color correction processing unit 2191 uses a correction factor to perform color correction in which, to compensate for a reduction in chromaticity of an image read by scanner unit 22 caused by an increase in temperature of light source 222 (e.g., white LED), the chromaticity of the image read by scanner unit 22 is increased to a level corresponding to the reference value of chromaticity.

In some embodiments, color correction processing unit 2191 reads an appropriate correction factor corresponding to the amount of chromaticity change calculated by chromaticity detecting unit 2161, and uses the read correction factor to perform color correction on an image read by scanner unit 22 (e.g., RGB image data).

Figure 16:
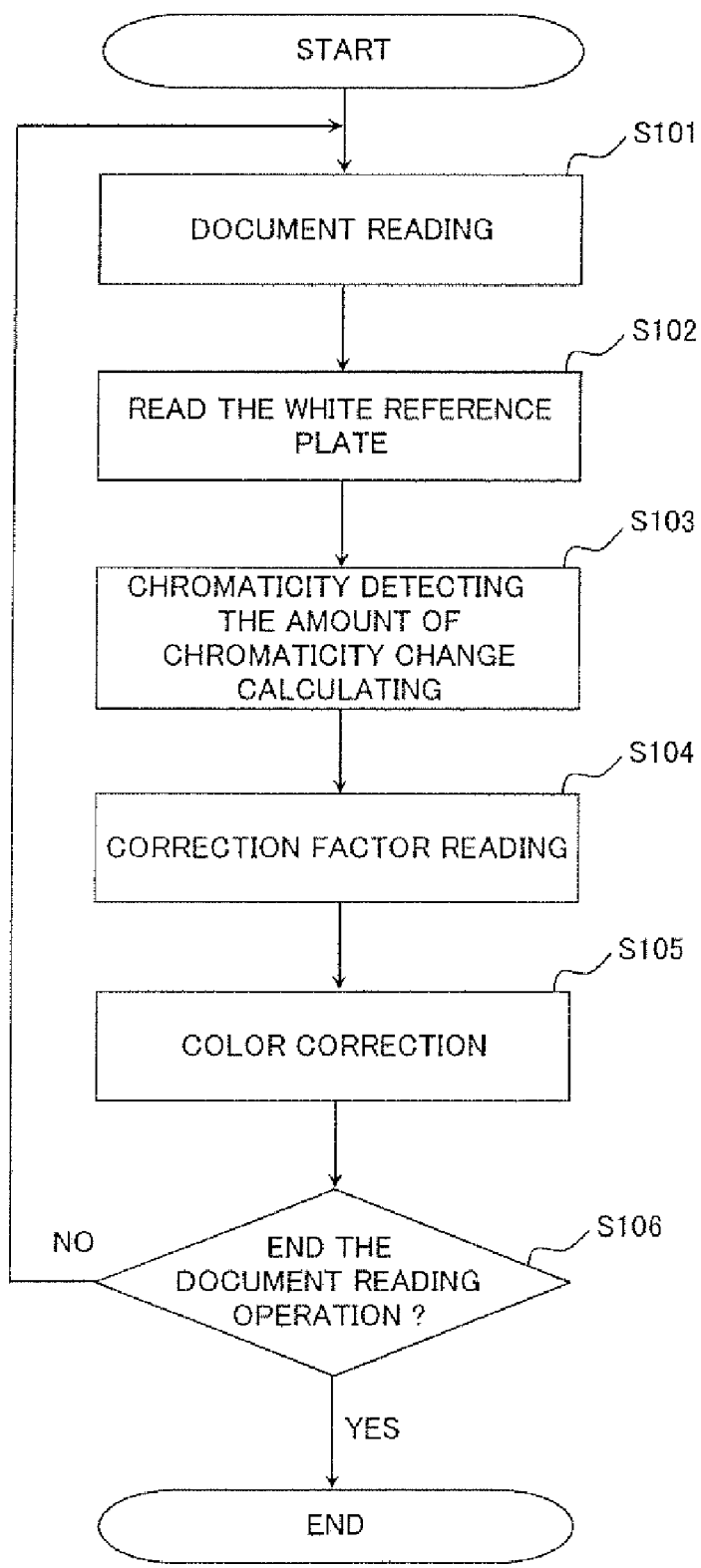
FIG. 16 is a flowchart illustrating processing of an embodiment in which the image reading device performs color correction on an image read by the scanner unit according to an embodiment.

FIG. 16 is a flowchart illustrating processing of an embodiment in which image reading device 2 performs color correction on an image read by scanner unit 22.

In some embodiments, during execution of a copying operation initiated in response to an copying operation execution instruction input from operation unit 5 by the operator, document conveying unit 21 starts conveying documents on document table 241 one by one toward reading position 230 of scanner unit 22, so that a document reading operation starts as shown in FIG. 16 as step S101. Before the leading end of a document reaches reading position 230 (or, in the case of the second and any following documents, after the trailing end of an already read document passes through reading position 230 and before the leading end of the next document to be read reaches reading position 230), drive control unit 215 causes scanner unit 22 to turn on light source 222 and read an image of white reference plate 10 (step S102).

While not shown in FIG. 16, a document image read by scanner unit 22 in step S101 may be color-separated into RGB data by scanner unit 22, sent to A/D converting unit 217 for A/D conversion, further sent to shading correcting unit 218 for shading correction, and sent out to image processing unit 219.

In some embodiments, chromaticity detecting unit 2161 may detect chromaticity of the image of white reference plate 10 read by scanner unit 22. Further in an embodiment, chromaticity change calculating unit 2165 may calculate the amount of chromaticity change between the chromaticity stored in reference value storage unit 2162 as a reference value and the chromaticity detected by chromaticity detecting unit 2161 (step S103). As described above, data of the read image of white reference plate 10 may be color-separated into RGB data by the color filter of scanner unit 22 and sent to chromaticity detecting unit 2161. On the basis of data of chromaticity (x,y) obtained by converting the RGB data, chromaticity detecting unit 2161 detects the chromaticity of the read image of white reference plate 10.

In some embodiments, color correction processing unit 2191 reads, from correction factor storage unit 2192, a correction factor corresponding to the calculated amount of chromaticity change (step S104).

In an embodiment, color correction processing unit 2191 uses the read correction factor to perform color correction on data of the image read by scanner unit 22, the data being image data obtained by A/D conversion and shading correction (step S105). For example, to compensate for a reduction in chromaticity of an image read by scanner unit 22 caused by an increase in temperature of light source 222 (e.g., white LED), color correction processing unit 2191 may perform color correction using the correction factor, so that the chromaticity of the image read by scanner unit 22 is increased to a level corresponding to the reference value of chromaticity. Thus, in some embodiments, color correction using the correction factor is performed on the data of the image read by scanner unit 22 in step S101.

In some embodiments, drive control unit 215 determines whether all the documents placed on document table 241 have been read. The processing of steps S101 to S105 are repeated until drive control unit 215 determines that all the documents have been read (step S106).

Figure 17:
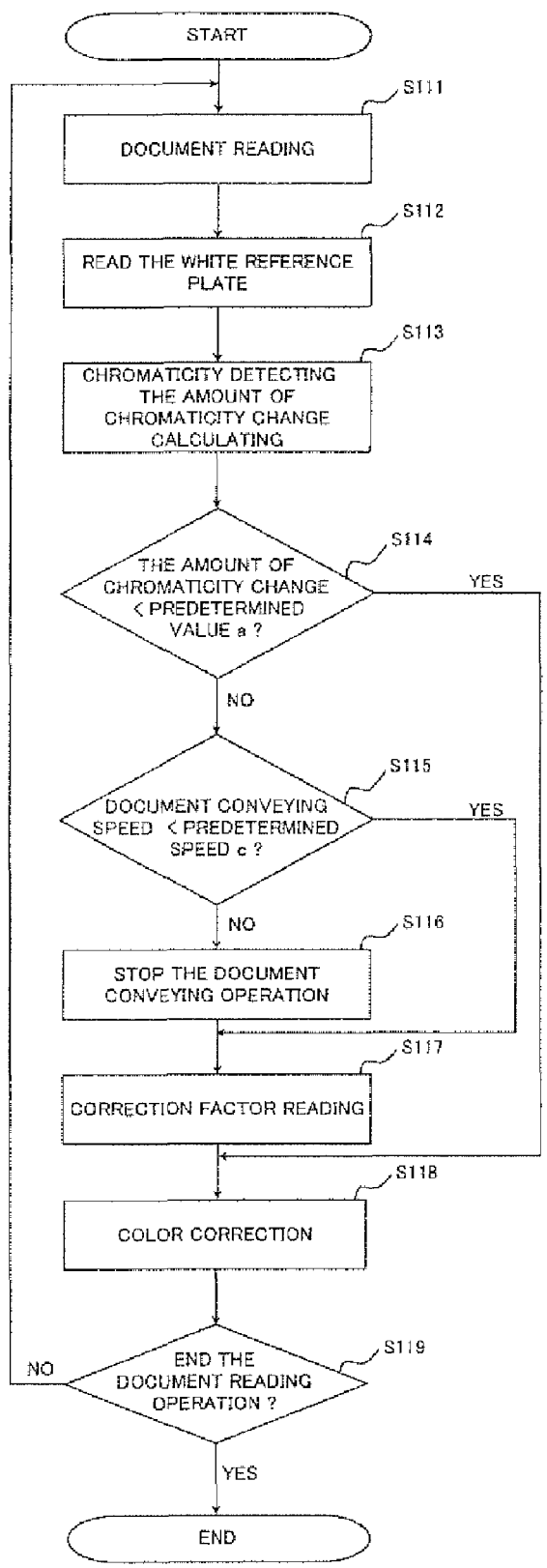
FIG. 17 is a flowchart illustrating processing of an embodiment in which the image reading device performs color correction on an image read by the scanner unit according to an embodiment.

FIG. 17 depicts a flowchart illustrating processing of an embodiment in which image reading device 2 performs color correction on an image read by scanner unit 22.

In an embodiment, color correction processing unit 2191 may determine whether the amount of chromaticity change calculated in step S113 is smaller than a predetermined value "a" (step S114). The predetermined value "a" indicates the amount of chromaticity change that is assumed to affect image quality. If this amount of change is as small as a predetermined level, color correction using a correction factor read from correction factor storage unit 2192 is not performed by color correction processing unit 2191.

If the amount of chromaticity change is smaller than the predetermined value "a" (YES in step S114), the processing of steps S115 to S117 is not performed, and the processing proceeds to step S118. In this case, color correction processing unit 2191 performs color correction using an original correction factor already set.

On the other hand, if the amount of chromaticity change is greater than or equal to the predetermined value "a" (NO in step S114), color correction processing unit 2191 determines, on the basis of speed information obtained from drive control unit 215, whether the document conveying speed of the document conveying unit 21 is lower than a predetermined value "c" (step S115). The speed indicated by the predetermined value "b" is a document conveying speed that is relatively high. At this speed, the duration from the time when the trailing end of one document reaches reading position 230 to the time when the leading end of the next document reaches reading position 230 (i.e., sheet interval) is short. This means that without stopping the document conveying operation, it may be difficult to perform correction factor reading processing and various types of processing necessary for the correction factor reading processing during the sheet interval.

If color correction processing unit 2191 determines that the document conveying speed of document conveying unit 21 is lower than the predetermined value "c" (YES in step S115), drive control unit 215 does not stop the document conveying operation performed by document conveying unit 21, and color correction processing unit 2191 performs color correction using a correction factor read from correction factor storage unit 2192 (steps S117 and S118).

In an embodiment, where color correction processing unit 2191 determines that the document conveying speed of the document conveying unit 21 is higher than or equal to the predetermined value "c" (NO in step S115), drive control unit 215 causes document conveying unit 21 to stop conveying the document (step S116), and then color correction processing unit 2191 performs color correction using a correction factor read from correction factor storage unit 2192 (steps S117 and S118). This is to ensure processing time for the correction factor reading processing and various types of processing necessary for the correction factor reading processing during each sheet interval, and thus to reflect the color correction processing of steps S117 and S118 in the document image read by scanner unit 22 in step S111.

Figure 18:
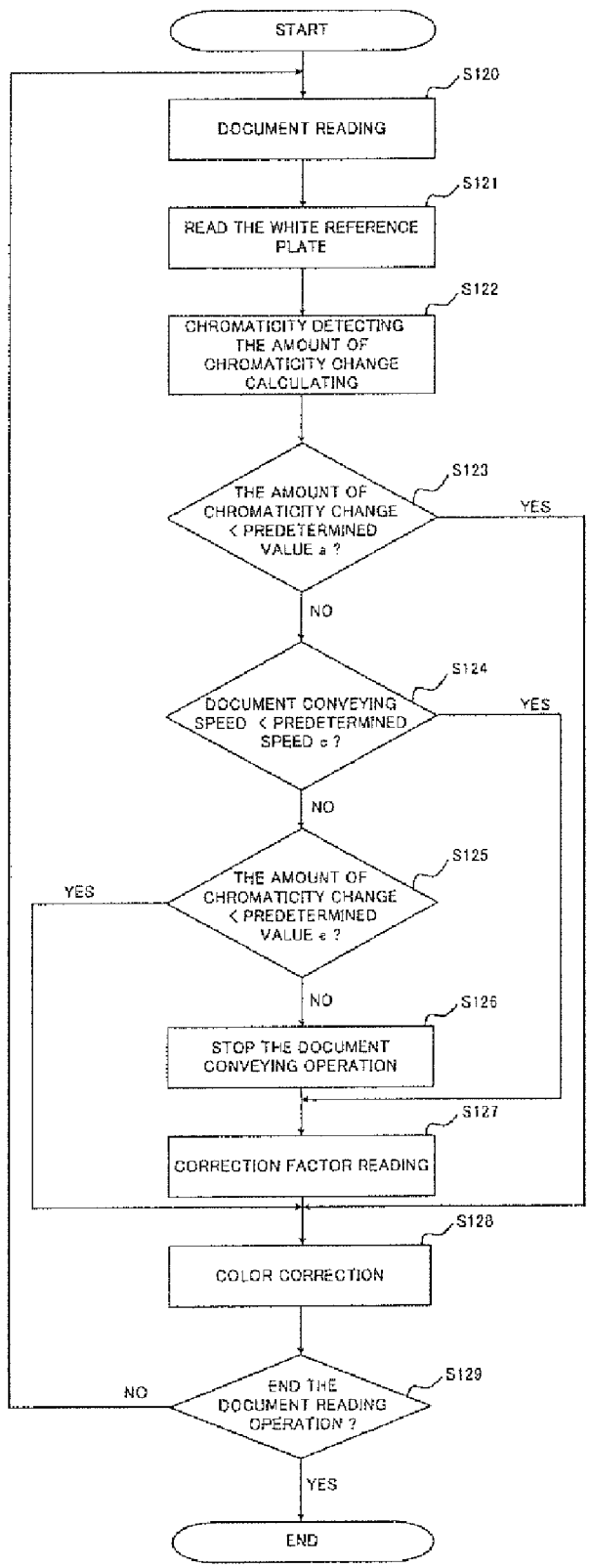
FIG. 18 is a flowchart illustrating processing of the third embodiment in which the image reading device performs color correction on an image read by the scanner unit according to the ninth embodiment.

FIG. 18 is a flowchart illustrating processing of an embodiment in which the image reading device 2 performs color correction on an image read by the scanner unit 22.

In an embodiment, after color correction processing unit 2191 determines that the document conveying speed of document conveying unit 21 is higher than or equal to the predetermined value "c" (NO in step S124), color correction processing unit 2191 further determines whether a difference between chromaticity detected by chromaticity detecting unit 2161 and a reference value representing chromaticity stored (i.e., the amount of chromaticity change from the reference value) is smaller than a predetermined value "e" (step S125). The predetermined value "e" indicates the amount of chromaticity change that has a relatively small impact on image quality and is greater than the predetermined value "a".

In embodiments where color correction processing unit 2191 determines that the amount of chromaticity change from the reference value is smaller than the predetermined value "e" (YES in step S125), drive control unit 215 does not stop the document conveying operation performed by document conveying unit 21 and allows scanner unit 22 to continue performing the document reading operation. Correction factor reading processing (step S127) is not performed.

On the other hand, if color correction processing unit 2191 determines that the amount of chromaticity change from the reference value is greater than or equal to the predetermined value "e" (NO in step S125), drive control unit 215 causes document conveying unit 21 to stop conveying the document (step S126), and then color correction processing unit 2191 performs color correction using a correction factor read from correction factor storage unit 2192 (steps S127 and S128).

In an embodiment, if the calculated amount of chromaticity change is small, priority is given to the speed of document reading operation and color correction using a correction factor read from correction factor storage unit 2192 is not performed, so that the document reading operation is performed quickly and smoothly. In embodiments, where there is a considerable change in chromaticity, priority is given to image quality. Specifically, if the calculated amount of chromaticity change reaches the predetermined value "e", the document reading operation is stopped and the color correction using a correction factor read from correction factor storage unit 2192 is performed.

Figure 19A:
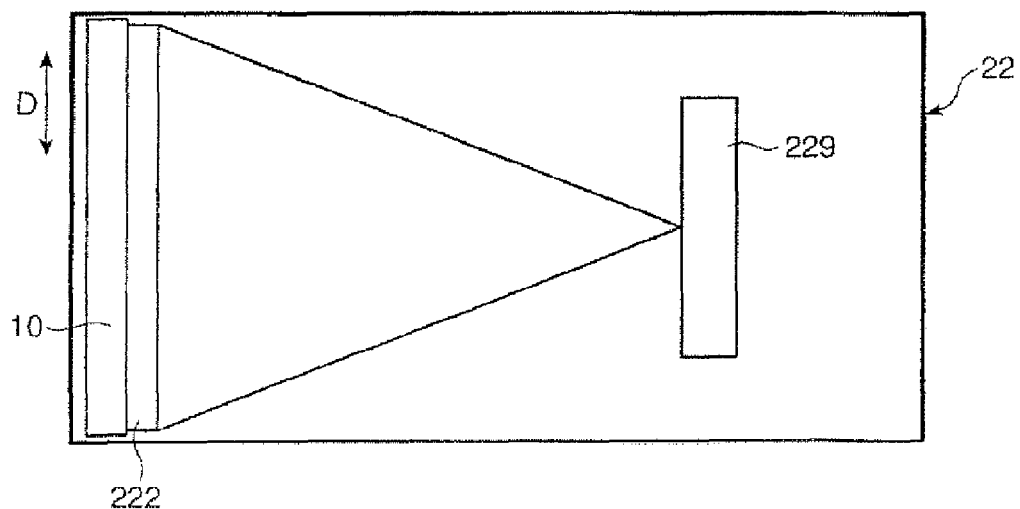
FIG. 19A illustrates an example of arrangement of a white reference plate.
Figure 19B:
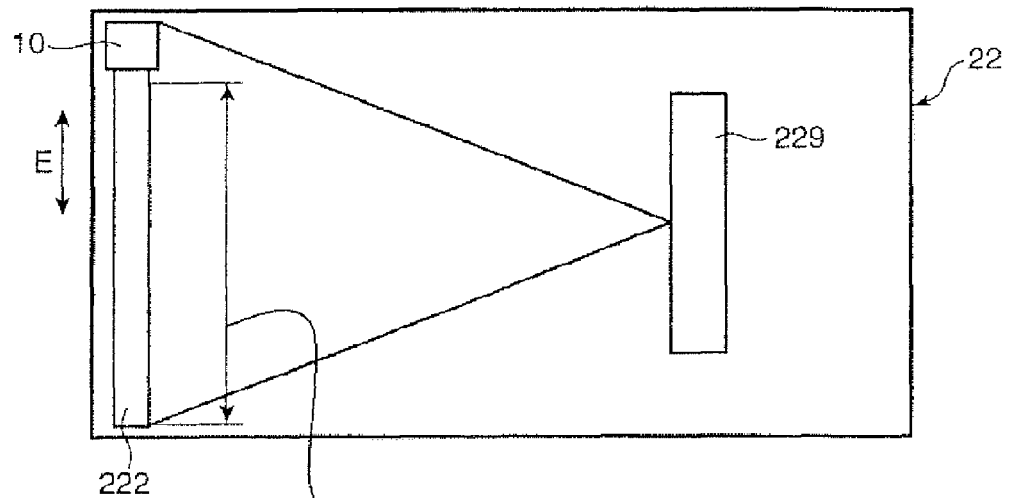
FIG. 19B illustrates another example of arrangement of the white reference plate.
Figure 20:
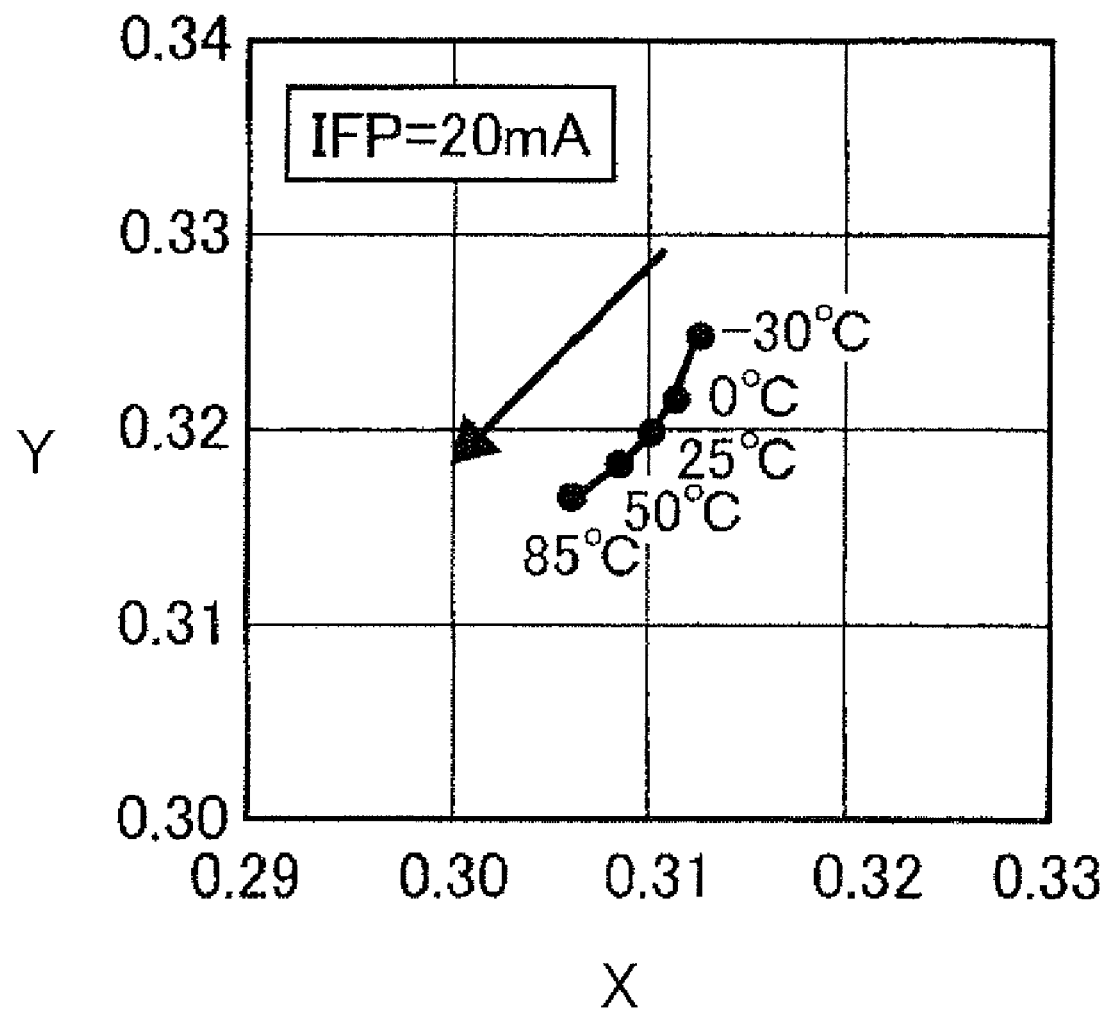
FIG. 20 is a graph showing a relationship between temperature of a white LED and chromaticity.
Figure 21:
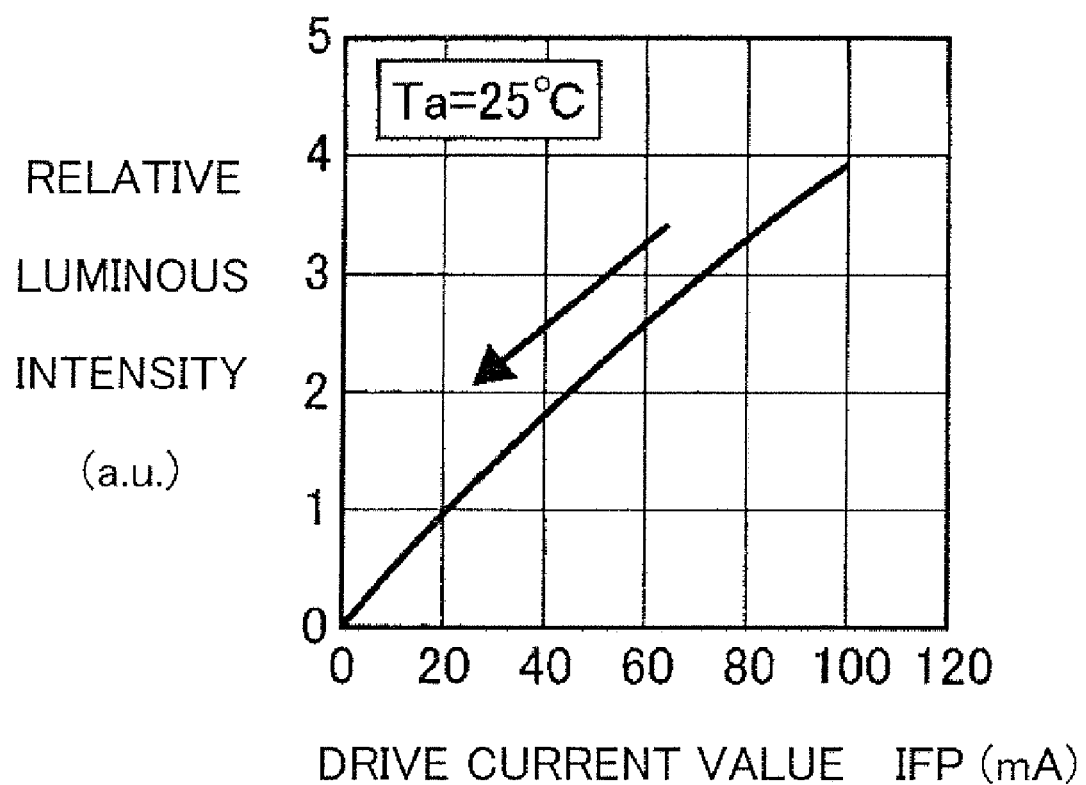
FIG. 21 is a graph showing a relationship between a drive current value for a white LED and luminous intensity of the white LED.
Figure 22:
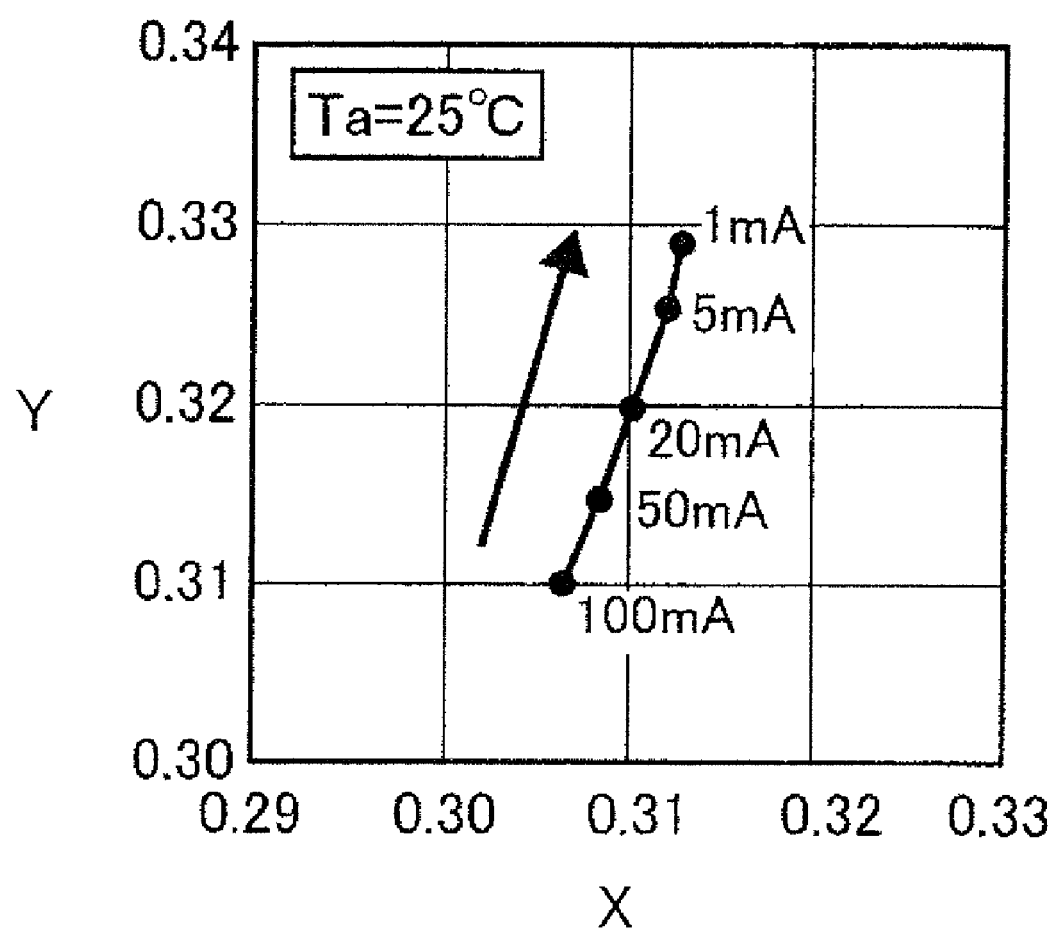
FIG. 22 is a graph showing a relationship between a drive current value for a white LED and chromaticity.

FIG. 19A illustrates an example of arrangement of white reference plate 10. FIG. 19B illustrates another example of arrangement of the white reference plate 10.

As illustrated in FIG. 19A, in an embodiment, white reference plate 10 may be arranged at a position opposite reading position 230 of scanner unit 22. White reference plate 10 extends in the main scanning direction (indicated by an arrow D in FIG. 19A) and is attached to platen board 239 (see FIG. 2).

With this arrangement of white reference plate 10, as shown in FIG. 19A, reading of an image of white reference plate 10, chromaticity detection, luminous intensity detection, gain correction, and automatic gain control are performed during intervals between documents being conveyed (sheet intervals).

In some embodiment, this arrangement of white reference plate 10 when reading an image of white reference plate 10 may allow for measurements of chromaticity, luminous intensity, and white reference value during intervals between documents being conveyed (e.g., sheet intervals).

In an embodiment, having this arrangement of white reference plate 10, reading of an image of white reference plate 10 may allow for measurement of chromaticity, chromaticity change calculation, and color correction using a correction factor read from the correction factor storage unit 2192 during intervals between documents being conveyed (sheet intervals).

As illustrated in an embodiment shown in FIG. 19B, white reference plate 10 may be arranged opposite reading position 230 of scanner unit 22, outside the maximum width of a document that can be read by scanner unit 22 in the direction of an arrow E (main scanning direction), and at one or both ends of a longitudinal direction of light source 222, the longitudinal direction being a direction in which light source 222 extends.

In an embodiment having this arrangement of white reference plate 10, regardless of whether it is during sheet intervals and even when scanner unit 22 is reading a document image, it is possible to perform reading of an image of white reference plate 10, chromaticity detection, gain correction, and automatic gain control. Therefore, in the processing where image reading device 2 corrects an output value of CCD 229 as illustrated in FIG. 5 to FIG. 7, reading of an image of white reference plate 10, chromaticity detection, gain correction, and automatic gain control are performed while scanner unit 22 is reading a document image. Thus, an output value sent out from CCD 229 to A/D converting unit 217 can be changed, in real time, to an output value obtained after automatic gain control performed using a corrected gain.

With this arrangement of white reference plate 10, regardless of whether it is during sheet intervals and even when scanner unit 22 is reading a document image, it is possible to perform reading of an image of white reference plate 10, chromaticity detection, and white reference value correction. Therefore, in the processing where the image reading device 2 performs shading correction as illustrated in FIG. 10 to FIG. 12, reading of an image of white reference plate 10, chromaticity detection, and white reference value correction are performed while scanner unit 22 is reading a document image. Thus, shading correction using a corrected white reference value can be performed, in real time, on an image read by scanner unit 22.

In some embodiments having this arrangement of white reference plate 10, regardless of whether it is during sheet intervals and even when scanner unit 22 is reading a document image, it is possible to perform reading of an image of white reference plate 10, chromaticity detection, and color correction using a correction factor read from correction factor storage unit 2192. Therefore, in the processing where image reading device 2 performs color correction as illustrated in FIG. 16 to FIG. 18, reading of an image of white reference plate 10, chromaticity detection, chromaticity change calculation, and color correction using a correction factor read from correction factor storage unit 2192 are performed while scanner unit 22 is reading a document image. Thus, color correction using a correction factor read from correction factor storage unit 2192 according to the amount of chromaticity change can be performed, in real time, on an image read by scanner unit 22.

The present invention is not limited to the embodiments described above, and may be variously modified. For example, in the embodiments described above, the multifunction peripheral 1 has been described as an example of the image forming apparatus according to an embodiment. However, the image forming apparatus according to the embodiment is not limited to a multifunction peripheral, and may be a copier, a facsimile, any other device capable of forming an image known in the art and/or combinations thereof.

The configurations and processing protocols of FIG. 1 to FIG. 19B are provided merely as examples of the image reading device and the image forming apparatus according to the present invention, and are not provided to limit the scope of the present invention.

Having thus described in detail embodiments of the present invention, it is to be understood that the invention defined by the foregoing paragraphs is not to be limited to particular details and/or embodiments set forth in the above description, as many apparent variations thereof are possible without departing from the spirit or scope of the present invention.

What is claimed is:

1. An image reading device comprising:
    a light source;
    an image reading unit including a photoelectric conversion element that reads an image illuminated by the light source;
    a drive control unit configured to drive the image reading unit;
    a white reference member arranged at a position which allows the image reading unit to perform image reading;
    a chromaticity detecting unit configured to detect chromaticity of an image of the white reference member read by the image reading unit;
    a reference value storage unit configured to store a first reference value representing chromaticity of the image of the white reference member read by the image reading unit and a second reference value representing luminous intensity of the light source at a predetermined normal temperature;
    a chromaticity change calculating unit configured to calculate the amount of chromaticity change between the chromaticity represented by the first reference value stored in the reference value storage unit and the chromaticity detected by the chromaticity detecting unit during operation of the image reading unit; and
    a control unit configured to control an operation of the image reading device according to the amount of chromaticity change calculated by the chromaticity change calculating unit,
    wherein the control unit comprises:
        a drive current correcting unit configured to correct, according to the amount of chromaticity change calculated by the chromaticity change calculating unit, a drive current value that the drive control unit uses to drive the light source;
        a luminous intensity detecting unit configured to detect luminous intensity of the light source driven by the drive control unit at the drive current value corrected by the drive current correcting unit; and
        a gain correcting unit configured to correct a gain according to the amount of change between the second reference value representing luminous intensity stored in the reference value storage unit and the luminous intensity of the light source driven at the corrected drive current value, the luminous intensity being detected by the luminous intensity detecting unit, and correct an output value from the photoelectric conversion element to a value corresponding to the second reference value representing luminous intensity by performing automatic gain control using the corrected gain.

2. The image reading device according to claim 1, further comprising a document conveying unit configured to convey documents,
    wherein the control unit controls an operation of the image reading device according to the amount of chromaticity change calculated by the chromaticity change calculating unit in a state where a document conveying operation of the document conveying unit is stopped by the drive control unit when a document conveying speed of the document conveying unit is a speed higher than a predetermined speed.

3. The image reading device according to claim 1, further comprising a document conveying unit configured to convey documents,
    wherein the image reading unit reads, at a predetermined reading position, an image of a document conveyed by the document conveying unit;
    the white reference member is arranged at a position opposite the reading position of the image reading unit; and
    when a document conveying speed of the document conveying unit is a predetermined first speed, the control unit controls an operation of the image reading device according to the amount of chromaticity change calculated by the chromaticity change calculating unit during a period in which a gap between documents conveyed by the document conveying unit is passing through the reading position, and when the document conveying speed of the document conveying unit is a second speed higher than the first speed, the control unit controls an operation of the image reading device according to the amount of chromaticity change calculated by the chromaticity change calculating unit in a state where a document conveying operation of the document conveying unit is stopped by the drive control unit.

4. The image reading device according to claim 1, further comprising a document conveying unit configured to convey documents,
    wherein the image reading unit reads, at a predetermined reading position, an image of a document conveyed by the document conveying unit;
    the white reference member is arranged at a position opposite the reading position of the image reading unit; and
    when a document conveying speed of the document conveying unit is a predetermined first speed, the gain correcting unit performs gain correction and automatic gain control during a period in which a gap between documents conveyed by the document conveying unit is passing through the reading position, and when the document conveying speed of the document conveying unit is a second speed higher than the first speed, the gain correcting unit performs gain correction and automatic gain control in a state where a document conveying operation of the document conveying unit is stopped by the drive control unit.

5. The image reading device according to claim 3, wherein even when the document conveying speed of the document conveying unit is the second speed higher than the first speed, if the calculated amount of chromaticity change does not reach a predetermined value, the control unit does not control an operation of the image reading device according to the amount of chromaticity change calculated by the chromaticity change calculating unit, and if the calculated amount of chromaticity change reaches the predetermined value, the control unit controls an operation of the image reading device according to the amount of chromaticity change calculated by the chromaticity change calculating unit in a state where a document conveying operation of the document conveying unit is stopped.

6. The image reading device according to claim 4, wherein even when the document conveying speed of the document conveying unit is the second speed higher than the first speed, if the calculated amount of luminous intensity change does not reach a predetermined value, the gain correcting unit does not perform gain correction and automatic gain control, and if the calculated amount of luminous intensity change reaches the predetermined value, the gain correcting unit performs gain correction and automatic gain control in a state where a document conveying operation of the document conveying unit is stopped.

7. The image reading device according to claim 1, wherein the light source includes a white light-emitting diode.

8. The image reading device according to claim 1, wherein the white reference member is arranged opposite a reading position of the image reading unit, outside the maximum width of a document that can be read, and at least one end of a longitudinal direction of the light source, the longitudinal direction being a direction in which the light source extends.

9. An image forming apparatus comprising the image reading device according to claim 1.

10. An image reading device comprising:
a light source;
an image reading unit including a photoelectric conversion element that reads an image illuminated by the light source;
a drive control unit configured to drive the image reading unit;
a white reference member arranged at a position which allows the image reading unit to perform image reading;
a chromaticity detecting unit configured to detect chromaticity of an image of the white reference member read by the image reading unit;
a reference value storage unit configured to store a first reference value representing chromaticity of the image of the white reference member read by the image reading unit and a second reference value representing luminous intensity of the light source at a predetermined normal temperature;
a chromaticity change calculating unit configured to calculate the amount of chromaticity change between the chromaticity represented by the first reference value stored in the reference value storage unit and the chromaticity detected by the chromaticity detecting unit during operation of the image reading unit; and
a control unit configured to control an operation of the image reading device according to the amount of chromaticity change calculated by the chromaticity change calculating unit,
wherein the control unit comprises:
a drive current correcting unit configured to correct, according to the amount of chromaticity change calculated by the chromaticity change calculating unit, a drive current value that the drive control unit uses to drive the light source;
a luminous intensity detecting unit configured to detect luminous intensity of the light source driven by the drive control unit at the drive current value corrected by the drive current correcting unit;
a shading correcting unit configured to perform shading correction on a document image read by the image reading unit using a white reference value obtained in a reading operation performed on the white reference member by the image reading unit; and
wherein the shading correcting unit adjusts the white reference value according to the amount of change between the second reference value representing the luminous intensity stored in the reference value storage unit and the luminous intensity of the light source driven at the corrected drive current value, the luminous intensity being detected by the luminous intensity detecting unit, and perform shading correction on a document image read by the image reading unit using the corrected white reference value.

11. The image reading device according to claim 10, further comprising a document conveying unit configured to convey documents,
wherein the image reading unit reads, at a predetermined reading position, an image of a document conveyed by the document conveying unit;
the white reference member is arranged at a position opposite the reading position of the image reading unit; and
when a document conveying speed of the document conveying unit is a predetermined first speed, the shading correcting unit corrects the white reference value during a period in which a gap between documents conveyed by the document conveying unit is passing through the reading position, and when the document conveying speed of the document conveying unit is a second speed higher than the first speed, the shading correcting unit corrects the white reference value in a state where a document conveying operation of the document conveying unit is stopped by the drive control unit.

12. The image reading device according to claim 11, wherein even when the document conveying speed of the document conveying unit is the second speed higher than the first speed, if the calculated amount of luminous intensity change does not reach a predetermined value, the shading correcting unit does not correct the white reference value, and if the calculated amount of luminous intensity change reaches the predetermined value, the shading correcting unit corrects the white reference value in a state where a document conveying operation of the document conveying unit is stopped.

13. The image reading device according to claim 10, wherein the light source includes a white light-emitting diode.

14. The image reading device according to claim 10, wherein the white reference member is arranged opposite a reading position of the image reading unit, outside the maximum width of a document that can be read, and at least one end of a longitudinal direction of the light source, the longitudinal direction being a direction in which the light source extends.

15. An image forming apparatus comprising the image reading device according to claim 10.

16. An image reading device comprising:
   a document conveying unit configured to convey documents;
   a light source;
   an image reading unit including a photoelectric conversion element that reads an image of the document illuminated by the light source;
   a drive control unit configured to drive the image reading unit;
   a white reference member arranged at a position which allows the image reading unit to perform image reading;
   a chromaticity detecting unit configured to detect chromaticity of an image of the white reference member read by the image reading unit;
   a reference value storage unit configured to store a first reference value representing chromaticity of the image of the white reference member read by the image reading unit at a predetermined normal temperature;
   a chromaticity change calculating unit configured to calculate the amount of chromaticity change between the chromaticity represented by the first reference value stored in the reference value storage unit and the chromaticity detected by the chromaticity detecting unit during operation of the image reading unit; and
   a control unit configured to control an operation of the image reading device according to the amount of chromaticity change calculated by the chromaticity change calculating unit,
   wherein the control unit comprises:
      a color correction processing unit configured to perform color correction on RGB image data output from the image reading unit; and
      a correction factor storage unit configured to store a plurality of correction factors the color correction processing unit uses to perform color correction on RGB image data output from the image reading unit, the correction factors corresponding to different amounts of chromaticity change,
   wherein the color correction processing unit reads a correction factor corresponding to the amount of chromaticity change calculated by the chromaticity change calculating unit from the correction factor storage unit, and performs color correction using the read correction factor on RGB image data output from the image reading unit,
   wherein the image reading unit reads, at a predetermined reading position, an image of a document conveyed by the document conveying unit,
   wherein the white reference member is arranged at a position opposite the reading position of the image reading unit, and
   wherein when a document conveying speed of the document conveying unit is a predetermined first speed, the color correction processing unit performs a correction factor reading operation during a period in which a gap between documents conveyed by the document conveying unit is passing through the reading position, and when the document conveying speed of the document conveying unit is a second speed higher than the first speed, the color correction processing unit performs a correction factor reading operation in a state where a document conveying operation of the document conveying unit is stopped by the drive control unit.

17. The image reading device according to claim 16, wherein even when the document conveying speed of the document conveying unit is the second speed higher than the first speed, if the calculated amount of chromaticity change does not reach a predetermined value, the color correction processing unit does not perform a correction factor reading operation, and if the calculated amount of chromaticity change reaches the predetermined value, the color correction processing unit performs a correction factor reading operation in a state where a document conveying operation of the document conveying unit is stopped.

18. The image reading device according to claim 16, wherein the light source includes a white light-emitting diode.

19. The image reading device according to claim 16, wherein the white reference member is arranged opposite a reading position of the image reading unit, outside the maximum width of a document that can be read, and at least one end of a longitudinal direction of the light source, the longitudinal direction being a direction in which the light source extends.

20. An image forming apparatus comprising the image reading device according to claim 16.

* * * * *